US009930197B2

(12) United States Patent
Yoshida et al.

(10) Patent No.: US 9,930,197 B2
(45) Date of Patent: Mar. 27, 2018

(54) IMAGE FORMING SYSTEM, IMAGE FORMING APPARATUS, INFORMATION CONVERTER, SERVER, AND COMPUTER-READABLE RECORDING MEDIUM

(71) Applicant: Konica Minolta, Inc., Chiyoda-ku, Tokyo (JP)

(72) Inventors: Eiichi Yoshida, Toyokawa (JP); Takuya Okada, Toyokawa (JP); Takeshi Hibino, Toyokawa (JP); Toshimi Shinchi, Toyokawa (JP); Kenichi Komaba, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/845,807

(22) Filed: Sep. 4, 2015

(65) Prior Publication Data

US 2015/0381832 A1    Dec. 31, 2015

Related U.S. Application Data

(62) Division of application No. 13/039,085, filed on Mar. 2, 2011, now Pat. No. 9,167,112.

(30) Foreign Application Priority Data

Mar. 4, 2010    (JP) ................................. 2010-047471

(51) Int. Cl.
*G06F 3/12* (2006.01)
*H04N 1/00* (2006.01)
(52) U.S. Cl.
CPC ....... *H04N 1/00474* (2013.01); *G06F 3/1205* (2013.01); *G06F 3/1244* (2013.01);
(Continued)

(58) Field of Classification Search
None
See application file for complete search history.

(56) References Cited

U.S. PATENT DOCUMENTS 6,914,687 B1 * 7/2005 Hosoda ................. G06F 3/1204
358/1.1
7,876,465 B2 * 1/2011 Matsueda .............. G06Q 10/06
358/1.15
(Continued)

FOREIGN PATENT DOCUMENTS

JP    2004-151893 A    5/2004
JP    2004-289500 A    10/2004
(Continued)

OTHER PUBLICATIONS

Office Action (Notice of Reason for Refusal) dated Feb. 14, 2012, by the Japanese Patent Office in corresponding Japanese Patent Application No. 2010-047471, and an English Translation of the Office Action. (11 pages).

*Primary Examiner* — Marcus T Riley
(74) *Attorney, Agent, or Firm* — Buchanan Ingersoll & Rooney PC

(57) ABSTRACT

An information converter includes an acquisition part for acquiring execution information of a specific function mode, the specific function mode being included in customized information which is operation setting information customized for a specific user and not being installed in a specific image forming apparatus; and a converter for dividing an operation to be executed in the specific function mode into a plurality of jobs which can be executed in the specific image forming apparatus and converting the execution information of the specific function mode into converted execution information described by using combination of the plurality of jobs.

20 Claims, 24 Drawing Sheets

(52) U.S. Cl.
CPC .......... *G06F 3/1257* (2013.01); *G06F 3/1271* (2013.01); *G06F 3/1285* (2013.01); *H04N 1/00405* (2013.01); *H04N 1/00413* (2013.01); *H04N 1/00482* (2013.01); *H04N 1/00514* (2013.01); *H04N 1/00938* (2013.01); *H04N 1/00973* (2013.01); *H04N 2201/0094* (2013.01)

(56) References Cited

U.S. PATENT DOCUMENTS

| | | | | |
|---|---|---|---|---|
| 7,920,286 | B2* | 4/2011 | Utsumi | G06F 17/30011 358/1.1 |
| 9,167,112 | B2* | 10/2015 | Yoshida | G06F 3/1205 |
| 2004/0080770 | A1 | 4/2004 | Hirose et al. | |
| 2006/0051149 | A1 | 3/2006 | Sawano | |
| 2006/0093380 | A1* | 5/2006 | Sugiura | G03G 15/5087 399/8 |
| 2006/0209343 | A1* | 9/2006 | Wanda | G06F 3/1213 358/1.15 |
| 2007/0050050 | A1 | 3/2007 | Tanida | |
| 2008/0252918 | A1 | 10/2008 | Nagata | |
| 2008/0259384 | A1* | 10/2008 | Ito | H04N 1/00957 358/1.15 |
| 2009/0168096 | A1* | 7/2009 | Toda | G06F 3/1222 358/1.15 |
| 2009/0201531 | A1* | 8/2009 | Pandit | G06Q 10/06 358/1.15 |
| 2010/0073715 | A1* | 3/2010 | Lee | G06F 3/1205 358/1.15 |
| 2013/0229679 | A1* | 9/2013 | Kamath | G06F 3/1207 358/1.15 |

FOREIGN PATENT DOCUMENTS

| | | |
|---|---|---|
| JP | 2005-228210 A | 8/2005 |
| JP | 2006-079353 A | 3/2006 |
| JP | 2007-067875 A | 3/2007 |
| JP | 2008-152535 A | 7/2008 |
| JP | 2008-263321 A | 10/2008 |

* cited by examiner

Fig.10

```
<Program-Mode>
 <Packed-Key>
  <Key-Num>4</Key-Num>
  <Copier-Mode>
   <Copies>2</Copies>
   <Nin1>2in1</Nin1>
   ...
   <Multi-tray-copy>
    tray=1, tray=2, tray=3, tray=4, tray=5
   </Multi-tray-copy>      ┊ TG41
   ...
  </Copier-Mode>
 </Packed-Key>
</Program-Mode>
```

```
<Program-Mode>
 <Packed-Key>
  <Key-Num>4</Key-Num>
  <Copier-Mode>
   <Copies>2</Copies>
   <Nin1>2in1</Nin1>

<Multi-tray-copy>
    <Scan-to-box>filename=temp20090921180125</Scan-to-box>
    <Box-to-print>filename=temp20090921180125, tray=1</Box-to-print>
    <Box-to-print>filename=temp20090921180125, tray=2</Box-to-print>
    <Box-to-print>filename=temp20090921180125, tray=3</Box-to-print>
    <Box-to-print>filename=temp20090921180125, tray=4</Box-to-print>
    <Box-to-print>filename=temp20090921180125, tray=5</Box-to-print>
    <Box-file-delete>
    </Box-file-delete>
   </Multi-tray-copy>                                                    ─ TR41
   :
  </Copier-Mode>
 </Packed-Key>
</Program-Mode>
```

(B1): "BOX STORAGE": PERFORM A SCAN AND STORE A SCAN IMAGE INTO A PREDETERMINED BOX (system box) AS A TEMPORARY FILE (FILE NAME = temp20090921118012)

(B2): "BOX CALL": SELECT THE TRAY TL1 AND PRINT THE TEMPORARY FILE (B3): "BOX CALL": SELECT THE TRAY TL2 AND PRINT THE TEMPORARY FILE (B4): "BOX CALL": SELECT THE TRAY TL3 AND PRINT THE TEMPORARY FILE (B5): "BOX CALL": SELECT THE TRAY TL4 AND PRINT THE TEMPORARY FILE (B6): "BOX CALL": SELECT THE TRAY TL5 AND PRINT THE TEMPORARY FILE (B7): "BOX DOCUMENT EDIT": DELETE THE TEMPORARY FILE IN THE BOX

Fig.14

```
<Program-Mode>
  <Packed-Key>
    <Key-Num>4</Key-Num>
    <Copier-Mode>
      <Copies>2</Copies>
      <Nin1>2in1</Nin1>
      :
      <Multi-tray-copy>
        <Scan-to-box>filename=temp20090921180125</Scan-to-box>
        <Box-to-print>filename=temp20090921180125, tray=1</Box-to-print>
        <Box-to-print>filename=temp20090921180125, tray=2</Box-to-print>
        <Box-to-print>filename=temp20090921180125, tray=3</Box-to-print>
        <Wait-operation>print_string="PLEASE CHANGE PAPER IN THE TRAYS 1 & 2 TO DESIRED PAPER.
                        WHEN READY, PLEASE PRESS THE START KEY.", wait=start_key
        <Box-to-print>filename=temp20090921180125, tray=1</Box-to-print>
        <Box-to-print>filename=temp20090921180125, tray=2</Box-to-print>
        <Box-file-delete>filename=temp20090921180125, attribute = not_delete
        </Box-file-delete>
      </Multi-tray-copy>
      :
    </Copier-Mode>
  </Packed-Key>
</Program-Mode>
```

(E1) "BOX STORAGE": PERFORM A SCAN AND STORE A SCAN IMAGE INTO A PREDETERMINED BOX (system box) AS A TEMPORARY FILE (FILE NAME = temp20090921180125)

(E2) "BOX CALL": SELECT THE TRAY TL1 AND PRINT THE TEMPORARY FILE (E3) "BOX CALL": SELECT THE TRAY TL2 AND PRINT THE TEMPORARY FILE (E4) "BOX CALL": SELECT THE TRAY TL3 AND PRINT THE TEMPORARY FILE (E5) "USER INTERVENTION FUNCTION": DISPLAY "PLEASE CHANGE PAPER IN THE TRAYS 1 & 2 TO DESIRED PAPER. WHEN READY, PLEASE PRESS THE START KEY." ON THE OPERATION PANEL; START WHEN THE START KEY IS PRESSED (E6) "BOX CALL": SELECT THE TRAY TL1 AND PRINT THE TEMPORARY FILE (E7) "BOX CALL": SELECT THE TRAY TL2 AND PRINT THE TEMPORARY FILE (E8) "BOX DOCUMENT EDIT": DELETE THE TEMPORARY FILE IN THE BOX

IMAGE FORMING SYSTEM, IMAGE FORMING APPARATUS, INFORMATION CONVERTER, SERVER, AND COMPUTER-READABLE RECORDING MEDIUM

This application is a divisional application of Ser. No. 13/039,085, which is based on Japanese Patent Application No. 2010-047471 filed on Mar. 4, 2010, the contents of which are hereby incorporated by reference.

BACKGROUND OF THE INVENTION

1. Field of the Invention

The present invention relates to an image forming system and a technique relating thereto.

2. Description of the Background Art

Image forming apparatuses such as MFPs (Multi Function Peripherals) each include a lot of functions. Therefore, it is not easy for users to select a desired function out of these many functions. For this reason, there is a technique for making entries of often-used functions and the like for each user in advance in order to facilitate selection of a desired function (call-up of a desired function). Further, suggested is a technique for calling up these function entries from a plurality of image forming apparatuses.

Japanese Patent Application Laid Open Gazette No. 2007-67875, for example, discloses a technique in which a user stores setting information (job record) relating to an MFP into a server (management apparatus) and when the user thereafter uses another MFP, the user downloads the setting information from the server to the MFP which is currently used by the user and uses the setting information in the MFP which is currently used. This allows each user who uses a plurality of MFPs to use his setting information in any MFP.

These MFPs, however, do not always have the same function modes, and in most cases, these MFPs have different number of and/or different types of functions. For this reason, in an environment where MFPs (low function MFPs) having a relatively small number of functions and MFPs (high function MFPs) having a relatively large number of functions are mixedly provided, for example, it may occur that a "function mode" (e.g., "double-sided printing", "N in 1", or the like) registered in a high function MFP cannot be performed by a low function MFP.

In order to solve the above problem, Japanese Patent Application Laid Open Gazette No. 2007-67875 sets out that it is determined whether or not there is a difference point in the use of the setting information (job record) between the apparatus (e.g., the high function MFP) which makes the setting information (job record) and another apparatus (e.g., the low function MFP) which makes an inquiry on the setting information (job record) and if there is any difference point, the setting information is processed. For example, a function (e.g., double-sided printing) which is not installed in the low function MFP is cancelled (turned off) and grayed out on a display screen of the low function MFP.

If such a "function" is cancelled by the above technique, however, it is turned out that this function cannot be used.

SUMMARY

It is an object of the present invention to provide a technique for facilitating use of operation setting information customized for a specific user in a plurality of image forming apparatuses.

The present invention is intended for an image forming system. According to a first aspect of the present invention, the image forming system comprises a calling part for calling up customized information which is operation setting information customized for a specific user, a converter for dividing an operation to be executed in a specific function mode which is installed in a first image forming apparatus and not installed in a second image forming apparatus into a plurality of jobs and changing execution information of the specific function mode to converted execution information described by using combination of pieces of execution information on the plurality of jobs when the specific function mode is included in the customized information, and a controller for executing an operation to implement the same function as that of the specific function mode in the second image forming apparatus by using the converted execution information.

The present invention is also intended for an information converter. According to a second aspect of the present invention, the information converter comprises an acquisition part for acquiring execution information of a specific function mode, the specific function mode being included in customized information which is operation setting information customized for a specific user and not being installed in a specific image forming apparatus, and a converter for dividing an operation to be executed in the specific function mode into a plurality of jobs which can be executed in the specific image forming apparatus and converting the execution information of the specific function mode into converted execution information described by, using combination of the plurality of jobs.

The present invention is further intended for an image forming apparatus. According to a third aspect of the present invention, the image forming apparatus comprises an acquisition part for acquiring execution information of a specific function mode, the specific function mode being included in customized information which is operation setting information customized for a specific user and not being installed in another image forming apparatus, and a converter for dividing an operation to be executed in the specific function mode into a plurality of jobs which can be executed in the another image forming apparatus and converting the execution information of the specific function mode into converted execution information described by using combination of the plurality of jobs.

The present invention is still further intended for a server connected to a plurality of image forming apparatuses via a network. According to a fourth aspect of the present invention, the server comprises an acquisition part for acquiring execution information of a specific function mode included in customized information which is operation setting information customized for a specific user and can be called up from the plurality of image forming apparatuses, and a converter for dividing an operation to be executed in the specific function mode which is not installed in a specific image forming apparatus among the plurality of image forming apparatuses into a plurality of jobs which can be executed in the specific image forming apparatus and converting the execution information of the specific function mode into converted execution information described by using combination of the plurality of jobs.

The present invention is yet further intended for a computer-readable recording medium. According to a fifth aspect of the present invention, the computer-readable recording medium records a computer program for causing a computer connected to a plurality of image forming apparatuses via a network to execute the steps of a) acquiring execution information of a specific function mode included in customized information which is operation setting information customized for a specific user and can be called up from the plurality of image forming apparatuses, and b) dividing an operation to be executed in the specific function mode which is not installed in a specific image forming apparatus among the plurality of image forming apparatuses into a plurality of jobs which can be executed in the specific image forming apparatus and converting the execution information of the specific function mode into converted execution information described by using combination of the plurality of jobs.

The present invention is still further intended for a computer-readable recording medium. According to a sixth aspect of the present invention, the computer-readable recording medium records a program for causing a computer embedded in an image forming apparatus to execute the steps of a) acquiring execution information of a specific function mode, the specific function mode being included in customized information which is operation setting information customized for a specific user and not being installed in another image forming apparatus, and b) dividing an operation to be executed in the specific function mode into a plurality of jobs which can be executed in the another image forming apparatus and converting the execution information of the specific function mode into converted execution information described by using combination of the plurality of jobs.

The present invention is yet further intended for an image forming system capable of calling up customized information which is operation setting information customized for a specific user from a plurality of image forming apparatuses. According to a seventh aspect of the present invention, the image forming system comprises a first image forming apparatus having a specific function mode, a second image forming apparatus not having the specific function mode, and an information converter for dividing an operation to be executed in the specific function mode into a plurality of jobs which can be executed in the second image forming apparatus and converting execution information of the specific function mode in the customized information into converted execution information described by using combination of the plurality of jobs.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a view showing an example of setting information (operation mode information);

FIG. 12 is a view showing converted operation mode information (including converted tag information);

FIG. 13 is a view showing a plurality of jobs after conversion;

FIG. 14 is a view showing converted operation mode information;

FIG. 15 is a view showing a plurality of jobs after conversion;

DESCRIPTION OF THE PREFERRED EMBODIMENTS

Hereinafter, the preferred embodiment of the present invention will be discussed with reference to the accompanying drawings.

<1. Overall System Configuration>

Figure 1:
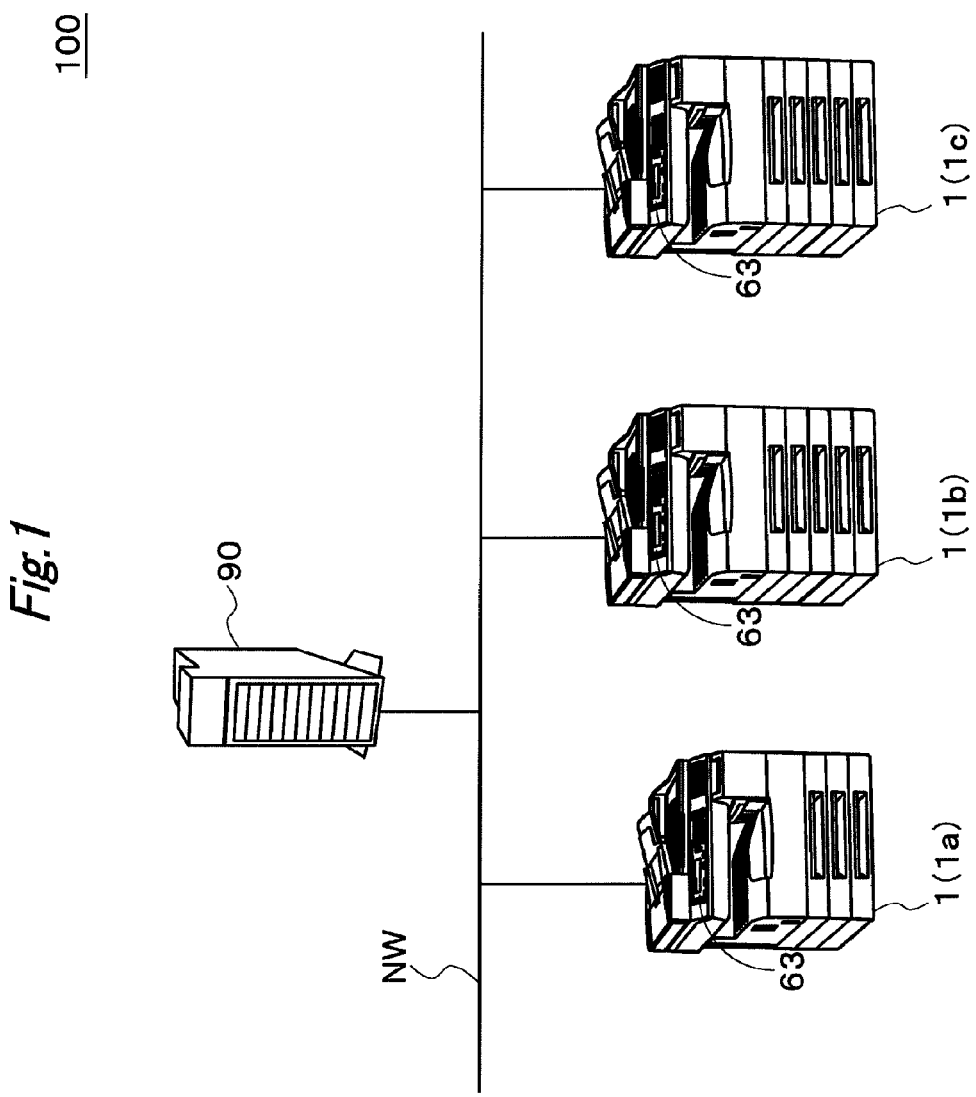
FIG. 1 is a schematic view showing a configuration of an image forming system.

FIG. 1 is a schematic view showing a configuration of an image forming system 100. The image forming system 100 comprises a data management apparatus 90 and a plurality of image forming apparatuses 1.

The data management apparatus 90 and the plurality of image forming apparatuses 1 are connected to one another via a network NW. Among the data management apparatus 90 and the image forming apparatuses 1, data can be transmitted and received to/from one another via the network NW. The network NW includes various networks such as a LAN (Local Area Network), a WAN (Wide Area Network), the internet, and the like.

The data management apparatus 90 is configured as, for example, a server computer (also referred to simply as "a server"), a network storage (NAS: Network Attached Storage), or the like. The data management apparatus 90 stores customized information and the like discussed later.

Herein, the image forming apparatus 1 is configured also as a Multi Function Peripheral (abbreviated as "MFP"). The MFP is an apparatus (also referred to as a multifunction machine) comprising a scanner function, a printer function, a copy function, a facsimile communication function and the like. Each image forming apparatus 1 is not limited to a MFP but may be configured as a copier, a scanner, or the like.

Further, herein, the plurality of image forming apparatuses 1 have similar constitutions. First, a common constitution of the plurality of image forming apparatuses 1 will be discussed below.

Figure 2:
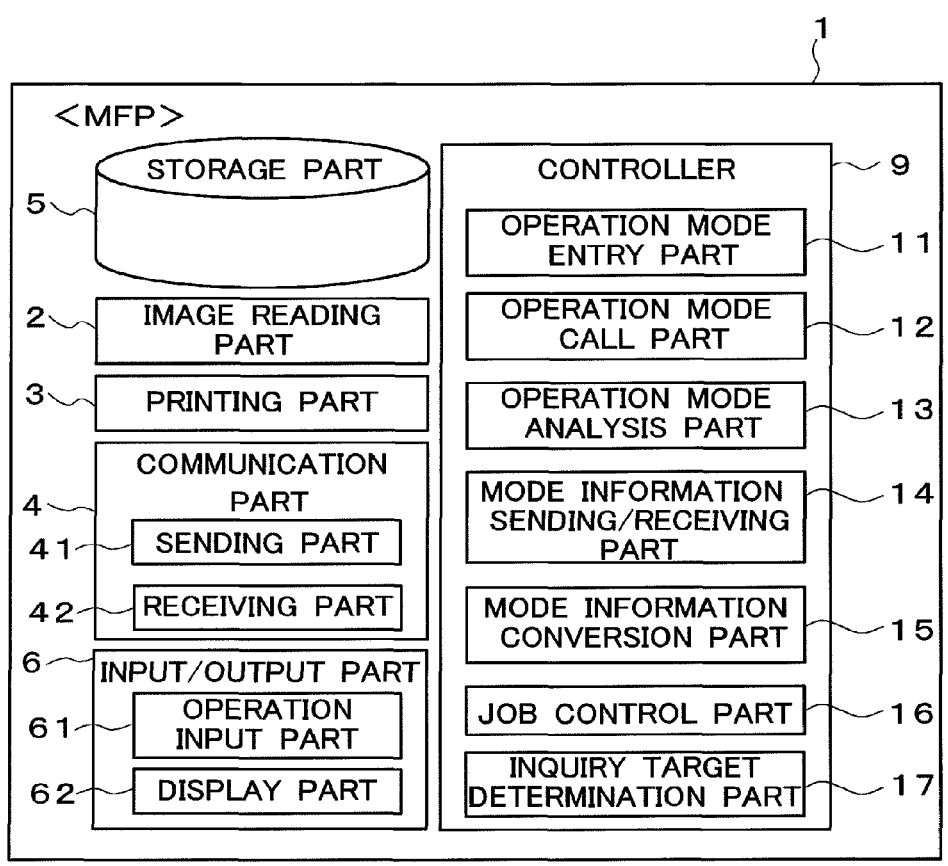
FIG. 2 is a view showing functional blocks of each image forming apparatus.

As shown in the functional block diagram of FIG. 2, each image forming apparatus 1 comprises an image reading part 2, a printing part 3, a communication part 4, a storage part 5, an input/output part 6, and a controller 9, and multiply uses these constituent parts to implement various functions.

The image reading part 2 is a processing part which optically reads an original manuscript placed on a predetermined position of the image forming apparatus 1 and generates image data of the original manuscript (an original manuscript image).

The printing part 3 is an output part which prints out the image to various media such as paper on the basis of the image data on an object image.

The communication part 4 is a processing part capable of performing facsimile communication via public networks or the like. Further, the communication part 4 is capable of performing network communication via a network NW. The network communication uses various protocols such as TCP/IP (Transmission Control Protocol/Internet Protocol), FTP (File Transfer Protocol), and the like, and by using the network communication, the image forming apparatus 1 can transmit and receive various data to/from desired partners.

The storage part 5 is a storage device such as a hard disk drive (HDD), a nonvolatile memory, or/and the like. In the storage part 5, stored is the original manuscript image (image data) generated by the image reading part 2, and the like.

The input/output part 6 comprises an operation input part 61 for receiving an input which is given to the image forming apparatus 1 and a display part 62 for performing an display output of various information. In more detail, the image forming apparatus 1 is provided with an operation panel 63 (see FIG. 1). The operation panel 63 is configured as a touch screen which is a liquid crystal display panel in which a piezoelectric sensor or the like is embedded. The operation panel 63 serves not only as a part of the display part 62 but also as a part of the operation input part 61. The input/output part 6 is capable of receiving input operations (e.g., an entry of a menu screen, an instruction for copy given by using the menu screen, and the like) performed by an operator (a user or the like).

The controller 9 is a control part for generally controlling the image forming apparatus 1. The controller 9 is a computer system which is embedded in the image forming apparatus 1 and comprises a CPU and various semiconductor memories (RAM, ROM, and the like). Various processing parts operate under the control of the controller 9 to implement various functions of the image forming apparatus 1. The controller 9 causes the CPU to execute a predetermined software program (hereinafter, referred to simply as a "program") PG stored in the ROM (e.g., EEPROM or the like), to thereby implement various processing parts. The ROM also stores various databases (e.g., a database used for performing an operation mode converting process (discussed later), and the like). Further, the program PG, the databases, or the like may be downloaded via the network NW or acquired via various portable recording media (non-transitory computer-readable recording media) (e.g., a USB memory or the like).

Specifically, the controller 9 implements various processing parts including an operation mode entry part 11, an operation mode call part 12, an operation mode analysis part 13, a mode information sending/receiving part 14, a mode information conversion part 15, a job control part 16, and an inquiry target determination part 17.

The operation mode entry part 11 is a processing part for making an entry of operation setting information customized for a specific user (referred to as "customized operation setting information" or also referred to simply as "customized information"). The operation mode entry part 11 makes an entry of customized information in accordance with an operation input made by a user. The customized information is sent from an apparatus which makes an entry of the information (e.g., an image forming apparatus 1c) to the data management apparatus 90 via the network NW and stored into the data management apparatus 90.

The operation mode call part 12 is a processing part for calling up the customized information stored in the data management apparatus 90 out to an apparatus (e.g., an image forming apparatus 1a) including this part 12. The operation mode call part 12 causes the customized information to be forwarded from the data management apparatus 90 to the apparatus (the image forming apparatus 1a) which calls up the information via the network NW and to be acquired by the apparatus.

The operation mode analysis part 13 analyzes an operation mode set as the customized information and determines whether or not this operation mode can be executed by the apparatus including this part 13.

The mode information sending/receiving part 14 sends and receives operation mode information (discussed later) via the network NW between another apparatus 1 and the data management apparatus 90 or the like.

The mode information conversion part 15 is a processing part for converting execution information of a specific function mode (discussed later) included in the operation mode (i.e., information used for executing the specific function mode) into "converted execution information". The converted execution information is execution information used for executing the same function as that of the specific function mode in at least one of the plurality of image forming apparatuses.

Specifically, as discussed later, the conversion is performed by dividing an operation to be executed in the specific function mode (discussed later) into a plurality of jobs. In the present preferred embodiment, it is assumed that the mode information conversion part 15 of an image forming apparatus 1b performs the operation mode converting process and the mode information conversion part 15 of the image forming apparatus 1a and the mode information conversion part 15 of the image forming apparatus 1c are not used. In other words, only the image forming apparatus 1b functions as an information converter for converting the mode information. Therefore, the mode information conversion part 15 has only to be provided in the image forming apparatus 1b and the image forming apparatuses 1a and 1c do not necessarily need to have the mode information conversion part 15.

The job control part 16 is a processing part for controlling a job to be executed in the image forming apparatus 1. The job control part 16 performs a job entry, a job execution control, a job delete, a job execution order control, and the like.

The inquiry target determination part 17 is a processing part for determining an apparatus to which an inquiry on the operation mode conversion is made. In the present preferred embodiment, it is assumed that the apparatus to which an inquiry is made is determined in advance. Therefore, the inquiry target determination part 17 always determines the image forming apparatus (1b) which is determined in advance as the apparatus to which an inquiry is made. This is, however, only one exemplary case, and an apparatus to which an inquiry is made may be determined by communication among the plurality of apparatuses.

Each of these image forming apparatuses 1 has such a constitution as generally discussed above.

In the present preferred embodiment, however, the image forming apparatus 1a and the image forming apparatus 1c have different capabilities. Specifically, the image forming apparatus 1a has a relatively small number of functions, which may be simply referred to as a "low function apparatus". On the other hand, the image forming apparatus 1c has a relatively large number of functions, which may be simply referred to as a "high function apparatus". Herein, the image forming apparatus 1c is a model superior to the image forming apparatus 1a and has all the functions which the image forming apparatus 1a has.

Figure 3:
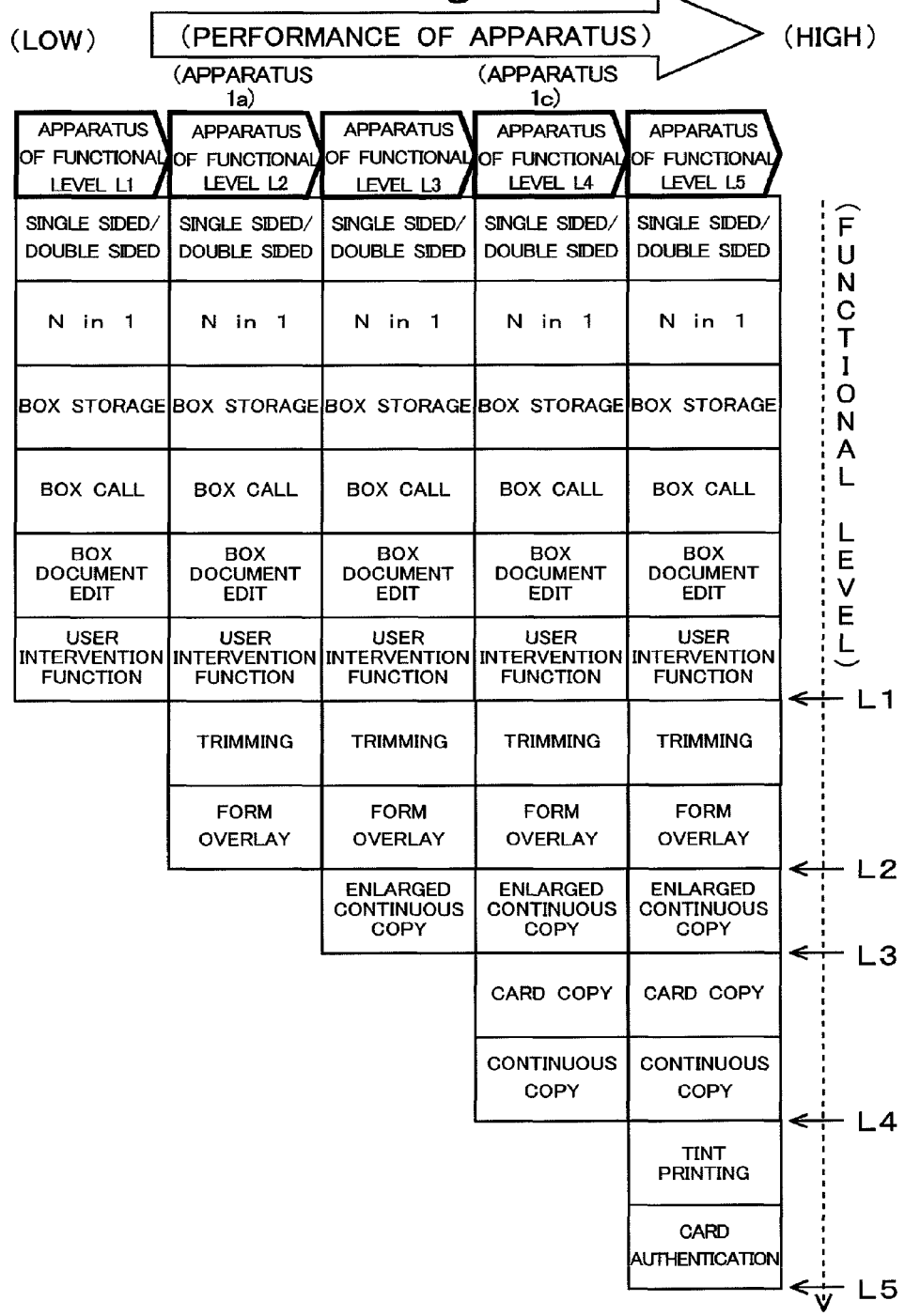
FIG. 3 is a view showing function modes of image forming apparatuses.

FIG. 3 is a view showing function modes of a plurality of types of image forming apparatuses. As shown in FIG. 3, an apparatus on the left side has a smaller number of functions and an apparatus on the right side has a larger number of functions.

As shown in FIG. 3, an image forming apparatus 1 of the functional level L1 has a plurality of functions such as "Single-sided/Double-sided Printing", "N in 1", "BOX Storage", "BOX Call", "BOX Document Edit", "User Intervention Function", and the like. An image forming apparatus 1 of the functional level L2 has functions of "Trimming" and "Form Overlay" as well as the functions that the image forming apparatus 1 of the functional level L1 has. An image forming apparatus 1 of the functional level L3 has a function of "Enlarged Continuous Copy" as well as the functions that the image forming apparatus 1 of the functional level L2 has. An image forming apparatus 1 of the functional level L4 has functions of "Card Copy" and "Continuous Copy" as well as the functions that the image forming apparatus 1 of the functional level L3 has. An image forming apparatus 1 of the functional level L5 has functions of "Ground Tint Printing" and "Card Authentication" as well as the functions that the image forming apparatus 1 of the functional level L4 has.

Herein, it is assumed that the image forming apparatus 1a is the apparatus of the functional level L2 and the image forming apparatus 1c is the apparatus of the functional level L4. The image forming apparatus 1b has the same functions as the image forming apparatus 1c has, and in other words, the image forming apparatus 1b is the apparatus of the functional level L4.

Figure 4:
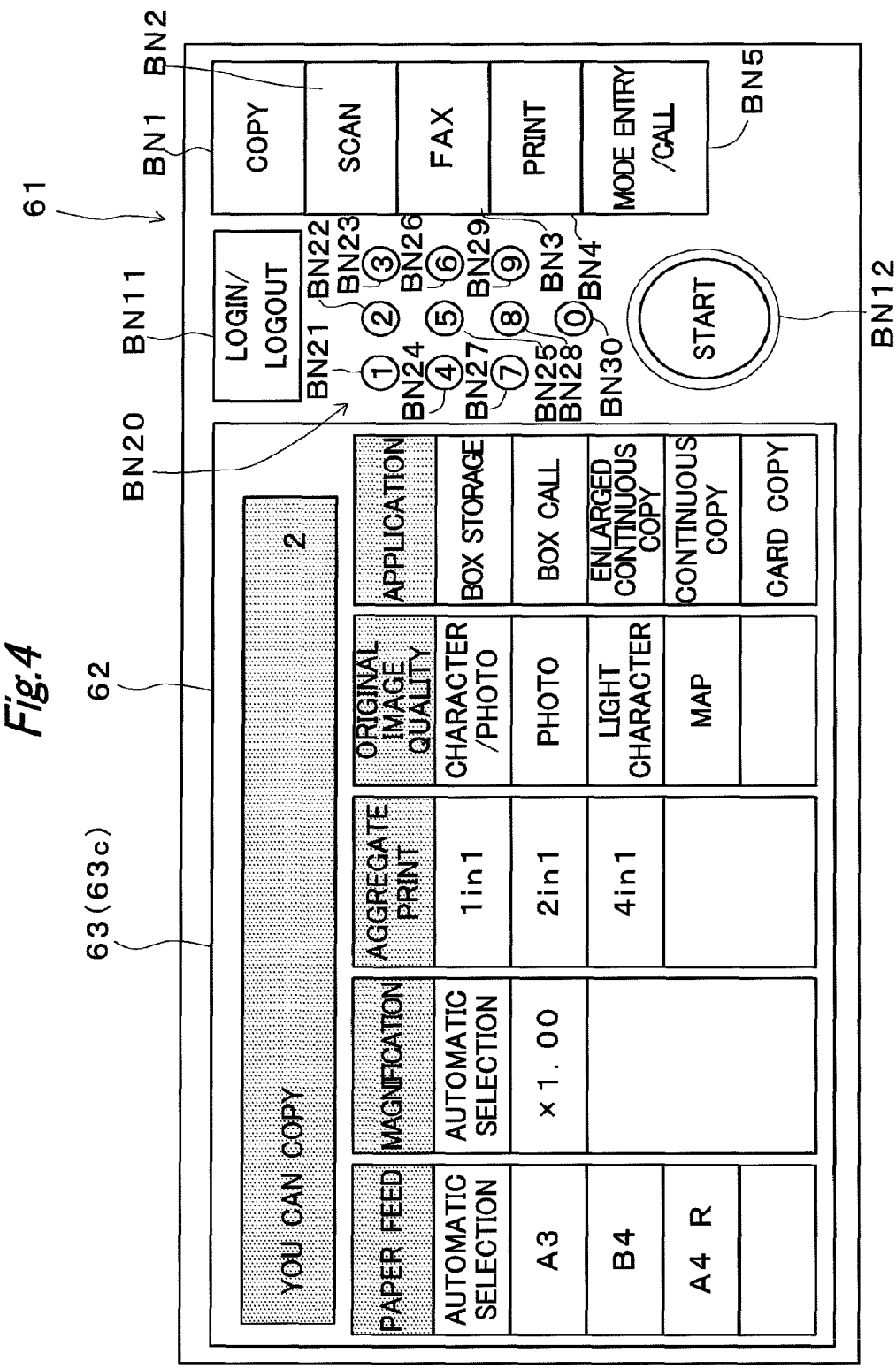
FIG. 4 is a view showing an operation panel and therearound of an image forming apparatus in which an entry is made.
Figure 5:
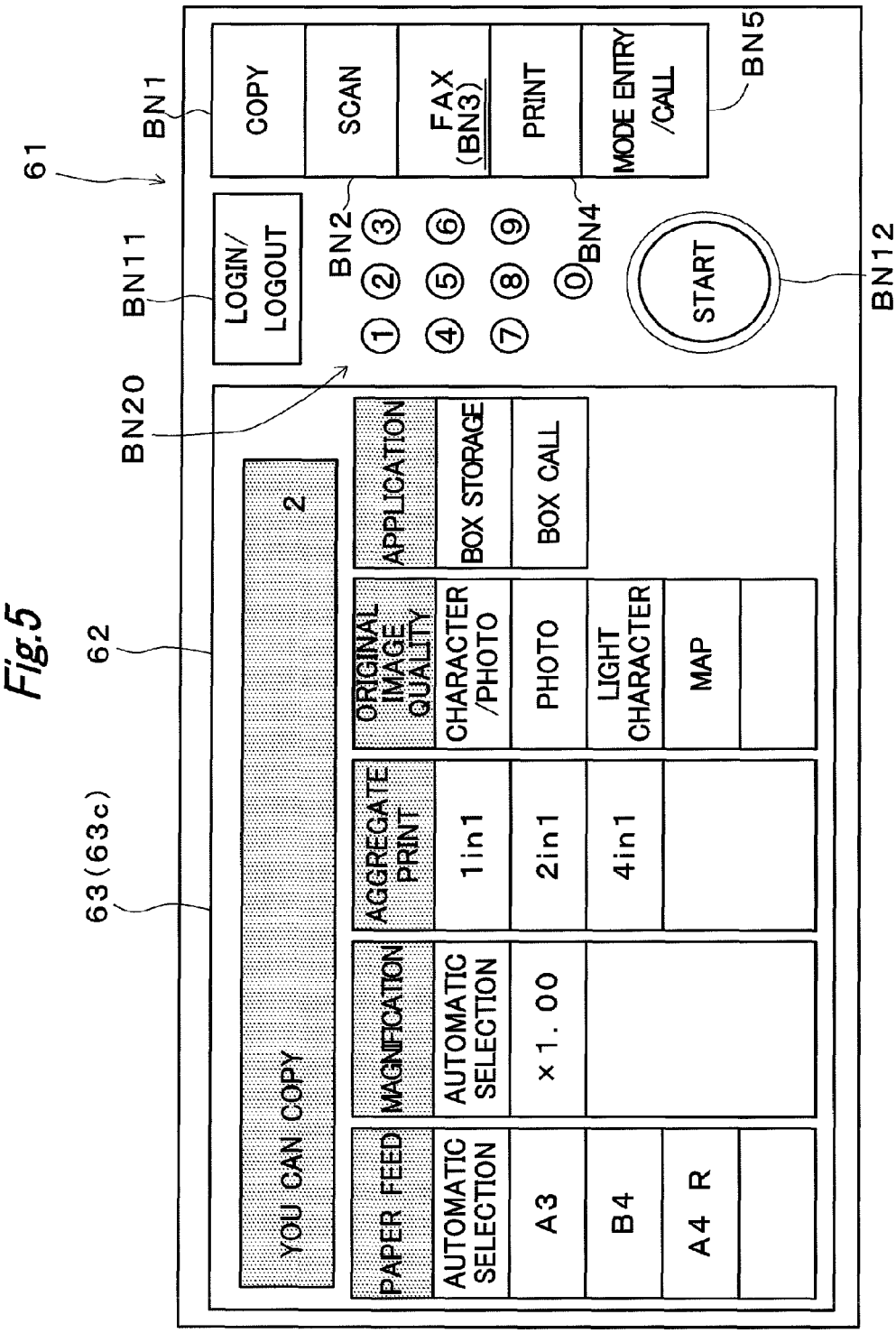
FIG. 5 is a view showing an operation panel and therearound of an image forming apparatus by which a call-up is performed.

FIG. 4 is a view showing the operation panel 63 (63c) and therearound of the image forming apparatus 1c, and FIG. 5 is a view showing the operation panel 63 (63a) and therearound of the image forming apparatus 1a. As shown in FIGS. 4 and 5, in the operation panels 63c and 63a, displayed are respective function setting screens (basic menu screens) relating to the image forming apparatuses 1c and 1a.

As can be seen from the comparison between FIGS. 4 and 5, displayed contents of the column of "Application" in the operation panels 63 are different from each other. Specifically, in the column of "Application" of the operation panel 63c in FIG. 4, there are buttons for selecting the functions of "Enlarged Continuous Copy", "Continuous Copy", and "Card Copy". On the other hand, in the column of "Application" of the operation panel 63a in FIG. 5, there is no button for selecting the function of "Enlarged Continuous Copy", "Continuous Copy", or "Card Copy". This is because the image forming apparatus 1c of the functional level L4 has the functions of "Enlarged Continuous Copy", "Continuous Copy", and "Card Copy" while the image forming apparatus 1a of the functional level L2 do not have the function of "Enlarged Continuous Copy", "Continuous Copy", or "Card Copy" (see FIG. 3).

As shown in FIGS. 4 and 5, in each of the operation panels 63 of the image forming apparatuses 1, provided are various buttons BN1 to BN5, BN11, BN12, and BN20 (BN21 to BN30) of the operation input part 61. The button BN1 is a selection button for "Copy" and the button BN2 is a selection button for "Scan". The button BN3 is a selection button for "FAX" and the button BN4 is a selection button for "Print". The button BN5 is a button used for displaying a screen for entry of an operation setting customized for a current user and will be discussed later in detail. The button BN11 is a button for "Login/Logout" and the button BN12 is a button for "Start". The button BN20 (in more detail, BN21 to BN30) is a numeric keypad (ten key) for inputting numerals.

Each user can use a login screen (not shown) to be displayed on the operation panel 63c in response to the pressing of the button BN11 to perform a login operation. More specifically, when the user inputs his user ID and password in a predetermined area of the login screen, the image forming apparatus 1 compares the inputted information on the user ID and the password with information registered in advance. It is thereby possible to determine whether the login user is a registered user (authorized user) or not and the login is OK or not.

<2. Customized Screen>

Next, a customized screen for each user will be discussed.

Each user can determine a desired setting by using such a setting screen as shown in FIGS. 4 and 5 and cause the image forming apparatus 1 to execute an operation specified by the setting. Repeating such a setting operation every time, however, is bothersome and may cause an operational problem.

Then, in order to solve the problem, this image forming system 100 makes it possible to make an entry of typical operation setting (referred to also as an operation mode) in advance for each user and call up the operation setting at the execution of the operation. As discussed later, a customized screen for each user (and customized operation setting information and the like) is common to a plurality of image forming apparatuses 1. In other words, each user can call up customized information which is customized for the user from the plurality of image forming apparatuses 1 in the image forming system 100 to use it.

For example, a user can make an entry of an operation of making "two copies" of an original in a "2 in 1 mode" in advance as a customized operation setting for the user. Alternatively, the user can also make an entry of an operation of making "two copies" of an original in a "continuous copy mode (multitray mode)" (discussed later) and a "2 in 1 mode" in advance as a customized operation setting for the user. Further, the user can call up the customized operation setting (customized information) registered in advance from the image forming apparatus by which the user makes the entry or a different image forming apparatus at an appropriate point of time to easily perform the same operation. The "continuous copy mode (multitray mode)" refers to a mode used for sequentially making a print on pieces of paper held in a plurality of trays. The "continuous copy mode" is used in a case, for example, where pieces of paper of different colors (blue, red, yellow, green, and white, or the like) are held in five trays TL1 to TL5 and the same content is printed on the paper of different colors.

The entry and call-up of such operations are performed by using the customized screen (setting screen) discussed next.

Hereinafter, an operation for entry of a customized screen (and customized information) or the like in the image forming apparatus 1c will be discussed. This entry operation is performed by the operation mode entry part 11 of the image forming apparatus 1c.

Figure 6:
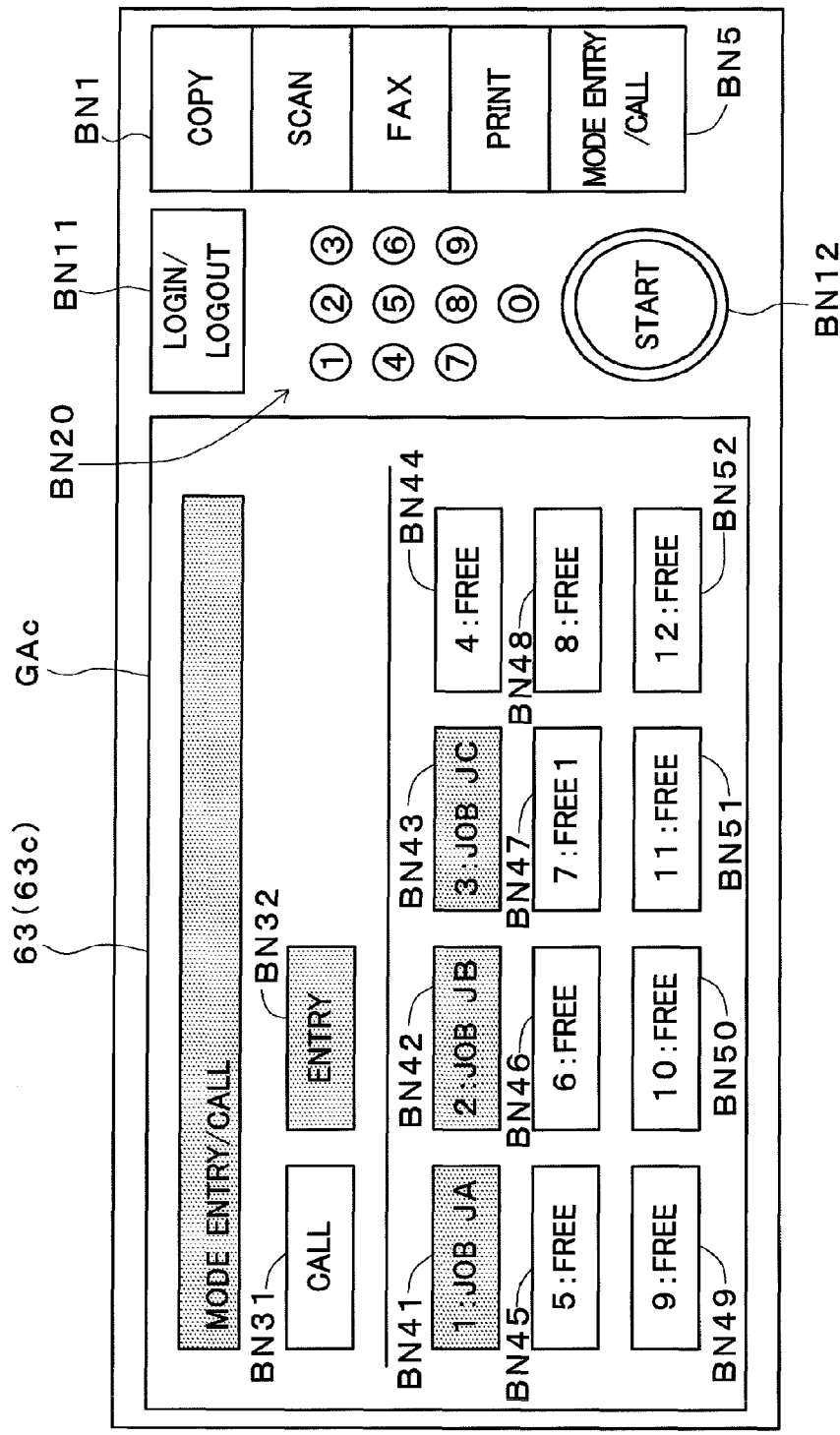
FIGS. 6 and 7 are views each showing a customized screen in the operation panel.

FIG. 6 is a view showing a customized screen (referred to also as a menu screen) GA (GAc) or the like in the operation panel 63c of the image forming apparatus 1c. The screen GAc is a screen to be displayed on the operation panel 63c in response to the pressing of the "Mode Entry/Call" button BN5 after the login of an operator (user).

By using the screen GAc, each user can make an entry of an operation setting (referred to as an operation mode) customized for the user in advance.

The screen GAc of FIG. 6 has a plurality of (virtual) buttons BN31, BN32, BN41 to BN52. The button BN31 is used for calling up a customized operation setting (referred to also as an operation mode). On the other hand, the button BN32 is used for making an entry of a customized operation setting (referred to also as an operation mode). Customized operations are associated with the plurality of buttons BN41 to BN52 arranged in a 3 by 4 matrix and entries of the customized operations are set to the corresponding buttons. These buttons BN31, BN32, BN41 to BN52 are software keys (softkeys). On the other hand, the above buttons BN1 to BN5, BN11, BN12, BN20 (BN21 to BN30) are hardware keys (hardkeys). This is, however, only an exemplary case, and each button may be a hardware key or a software key.

For example, after an appropriate setting operation is made, by pressing the button BN32 and so on, a user UA can make an entry of new setting information (operation mode).

Figure 8:
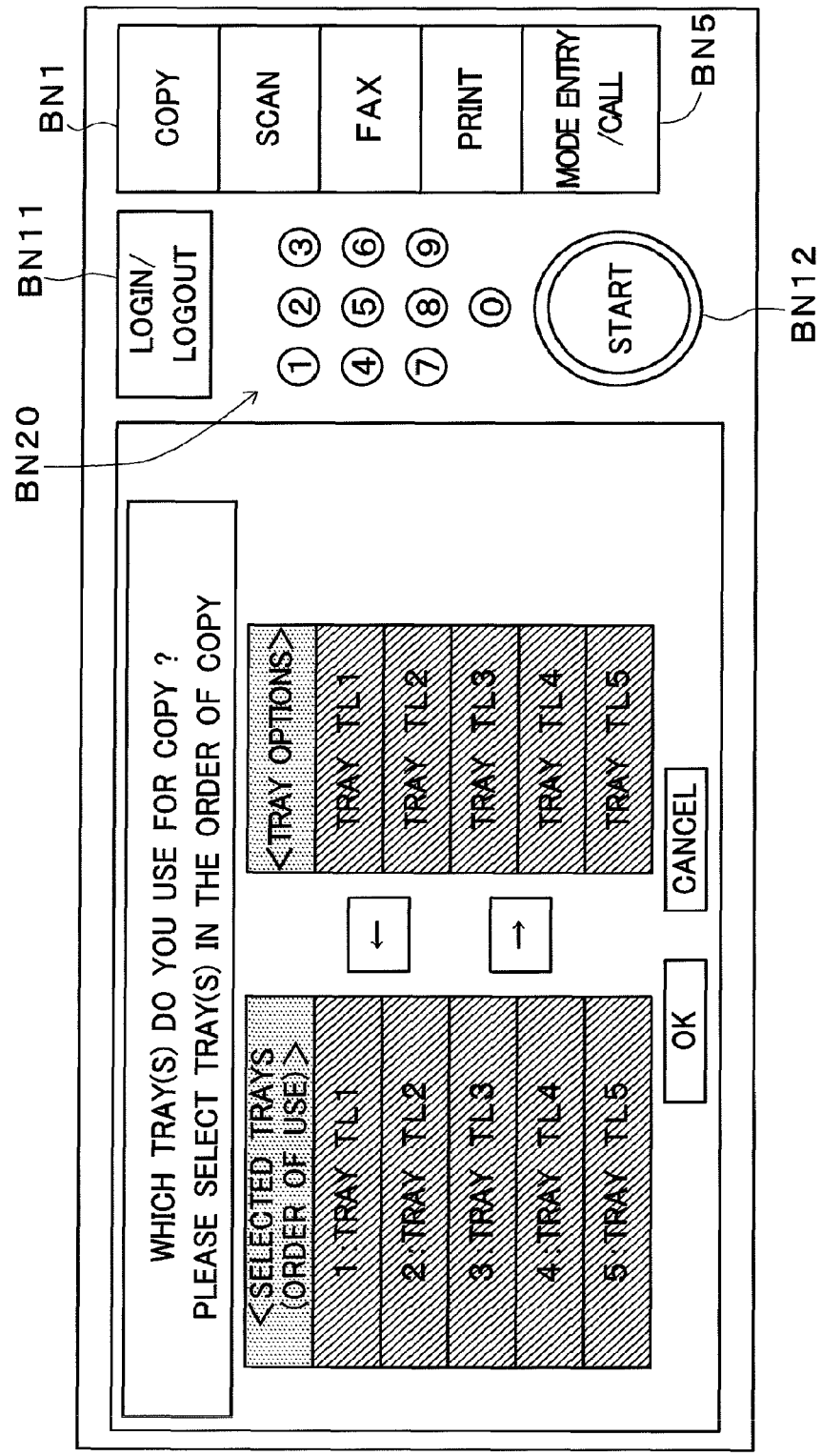
FIG. 8 is a view showing a detailed setting screen of continuous copy mode (multitray mode)

Specifically, first in the basic menu screen of FIG. 4, the user UA presses the key (ten key) BN22 of numeral "2" to set the number of copies to "two". The user UA further presses the "2 in 1 mode" button of the aggregate print to set the "2 in 1 mode" and then presses the "Continuous Copy" button of the application to set the "continuous copy mode (multitray mode)". For setting the continuous copy mode, for example, such a screen as shown in FIG. 8 is used. By using the screen of FIG. 8, a plurality of trays to be used in the continuous copy mode are selected and set in accordance with the order of print. For example, the user UA has only to select a desired one out of a plurality of tray options ("Tray TL1", "Tray TL2", . . . ) included in the column of "Tray Options" and press a "left arrow key (.rarw.)" in the center of the screen to move the selected tray to the column of "Selected Trays (Order of Use)". By performing an operation of setting the trays in accordance with the order of print, a plurality of selected trays are arranged in the column of "Selected Trays (Order of Use)" on the left side of the screen from the top in accordance with the order of print. In FIG. 8, shown are "1: Tray TL1", "2: Tray TL2", . . . and this means that the "tray TL1" is the first tray to be used for print, the "tray TL2" is the second tray to be used for print, and the like.

After that, the user UA presses the "Mode Entry/Call" button BN5 to display the screen GAc (FIG. 6) on the operation panel 63c. At this point of time, however, the buttons BN41 to BN52 are not displayed yet in the screen GAc.

Then, when the user UA presses the "Entry" button BN32 in the screen GAc, the image forming apparatus 1c communicates with the data management apparatus 90 to receive the customized information relating to the user UA and displays the buttons BN41 to BN52 in the screen GAc.

Herein, it is assumed that the entries of the contents with such names as "1: Job JA", "2: Job JB", and "3: Job JC" have been set to the buttons BN41, BN42, and BN43, respectively, and the respective button names are displayed in the buttons BN41 to BN43. In each of the other buttons BN44 to BN52 to which no entry of content is set, there is an indication of "Free".

Then, the user UA presses the button BN44 for new entry. In response to the pressing of the button BN44, a button name input screen (not shown) is displayed and a name "Job JD" is given by using the button name input screen. When an OK button (not shown) in the button name input screen is pressed, an entry of the setting information indicating that "two copies" are made by using the "continuous copy mode" and the "2 in 1 mode" is set to the button BN44. The setting information (entry information) relating to the button Bn44 is sent from the image forming apparatus 1c to the data management apparatus 90 in response to the pressing of the OK button (see FIG. 9).

FIG. 10 is a view showing an example of setting information (operation mode information). The setting information is described in an XML (Extensible Markup Language) format as shown in FIG. 10 and stored. The description "<Key-Num>4</Key-Num>" indicates that the button for new entry is the "fourth" button BN44, and the description "<Copier-Mode>" indicates a coy mode. The description "<Copies>2</Copies>" indicates that the number of copies is "two", and the description "<Nin1>2 in1</Nin1>" indicates that the "2 in 1 mode" is specified as the function mode (aggregate print mode). Further, the description "<Multi-tray-copy>tray=1, tray=2, tray=3, tray=4, tray=5</Multi-tray-copy>" indicates that the "continuous copy mode" is specified as the function mode and printing (copying) is performed for pieces of paper held in the five trays TL1, TL2, TL3, TL4, and TL5 in this order. The setting information is described thus, for example.

Each user can call up the registered setting information (operation mode) by pressing the button BN31. The user UA can call up the setting information set in the operation panel 63c by pressing the button BN31 in the operation panel 63c.

Further, each user can call up the registered setting information from the data management apparatus 90 also in the image forming apparatus 1a different from the image forming apparatus 1c in which the entry operation is performed. Specifically, in the present image forming system 100, the customized screen (customized operation setting and the like) for each user is common to a plurality of image forming apparatuses.

For example, the user UA can call up the setting information (operation mode) of which the entry is made in the image forming apparatus 1c (referred to also as an apparatus in which the entry is made or an apparatus in which the information is generated) from another image forming apparatus 1a (referred to as a calling apparatus). Specifically, the operation mode call part 12 of the image forming apparatus 1a calls up the customized information stored in the data management apparatus 90 to the apparatus 1a.

Figure 7:
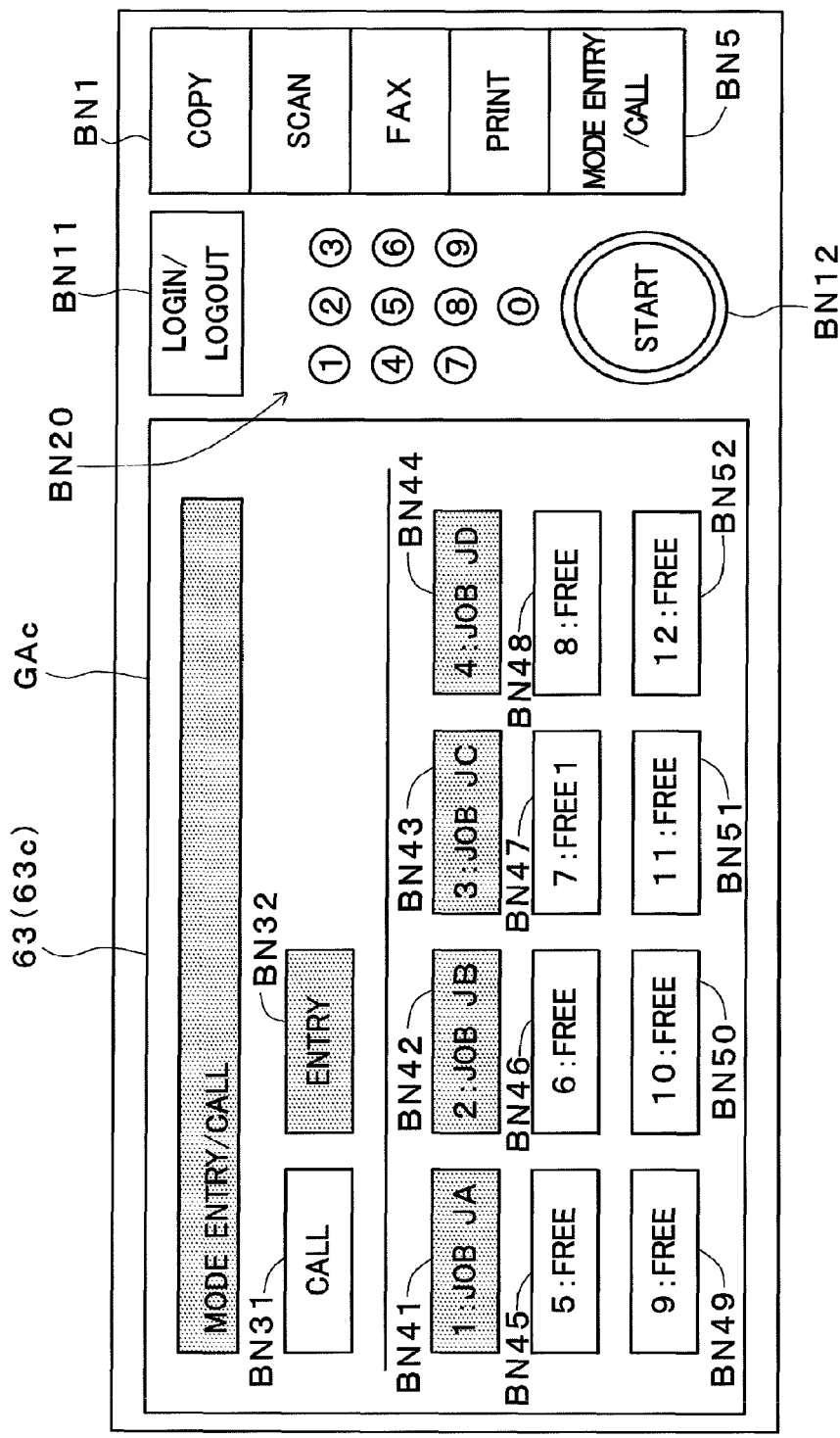
Figure 11:
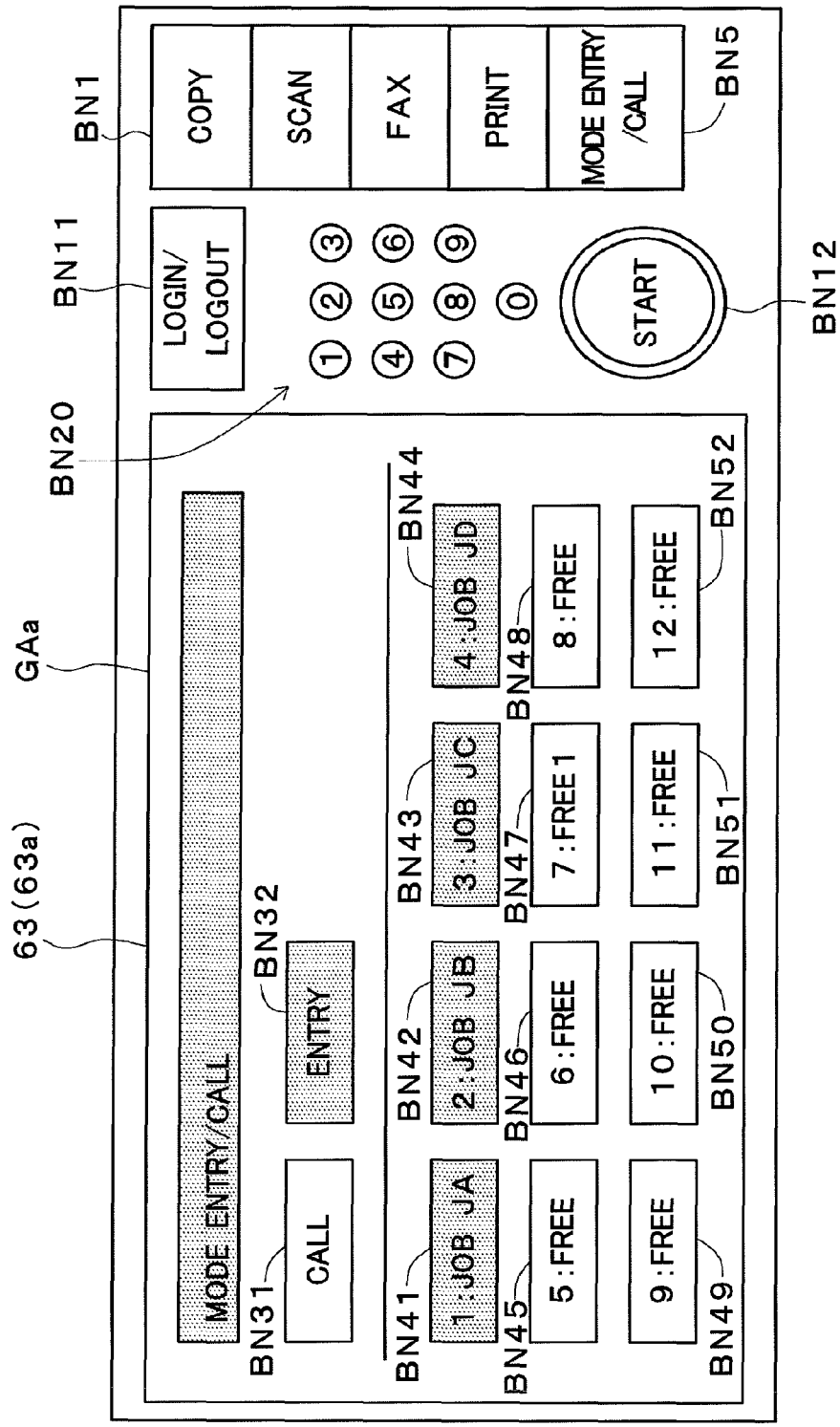
FIG. 11 is a view showing a customized screen displayed on another image forming apparatus.

In more detail, after the login to the image forming apparatus 1a, the user UA presses the "Mode Entry/Call" button BN5 (FIG. 5). The same screen GAa (in which the buttons BN41 to BN52 are not displayed yet) as the screen GAc shown in FIG. 7 is displayed on the operation panel 63a of the image forming apparatus 1a. Then, when the user UA presses the button BN31 on the operation panel 63a, the image forming apparatus 1a communicates with the data management apparatus 90 to receive the customized information (setting information) relating to the user UA from the data management apparatus 90 and displays the buttons BN41 to BN52 in the screen GAa on the basis of the received customized information. As a result, as shown in FIG. 11, the same screen GAa as the screen GAc shown in FIG. 7 is displayed on the operation panel 63a of the image forming apparatus 1a.

The user UA can select an operation corresponding to the "Job JD" by using the screen GAa.

As discussed above, however, the image forming apparatus 1a is a model inferior to the image forming apparatus 1c and does not the function of "continuous copy mode". Therefore, if no measure is taken, the image forming apparatus 1a cannot perform the function of "continuous copy mode" since there is a difference in function between the image forming apparatus 1a and the image forming apparatus 1c as discussed above.

Then, in the present preferred embodiment, an exemplary case will be discussed below, where a specific function mode (e.g., the "continuous copy mode") which can be performed in the image forming apparatus 1c is divided into a plurality of jobs which can be performed in the image forming apparatus 1a and the same function as that of the specific function mode is reconstructed by combining some of the plurality of jobs. In short, discussion will be made on a case where an operation of converting the function mode (the operation is referred to also as a function converting operation) is performed. By such a converting operation, even when a specific function mode is not included in the image forming apparatus 1a, the image forming apparatus 1a can perform the same function as that of the specific function mode.

Hereinafter, discussion will be made on a case where the image forming apparatus 1b performs such a function converting operation. Specifically, in response to the inquiry from the image forming apparatus 1a, the image forming apparatus 1b divides specific functions to be implemented in a specific function mode (e.g., the "continuous copy mode") into a combination of a plurality of jobs and generates the combination of the plurality of jobs as a job (substitution job or alternative job) corresponding to the specific function mode. The substitution job is sent from the image forming apparatus 1b to the image forming apparatus 1a (see FIG. 9).

<3. Operation>

Figure 9:
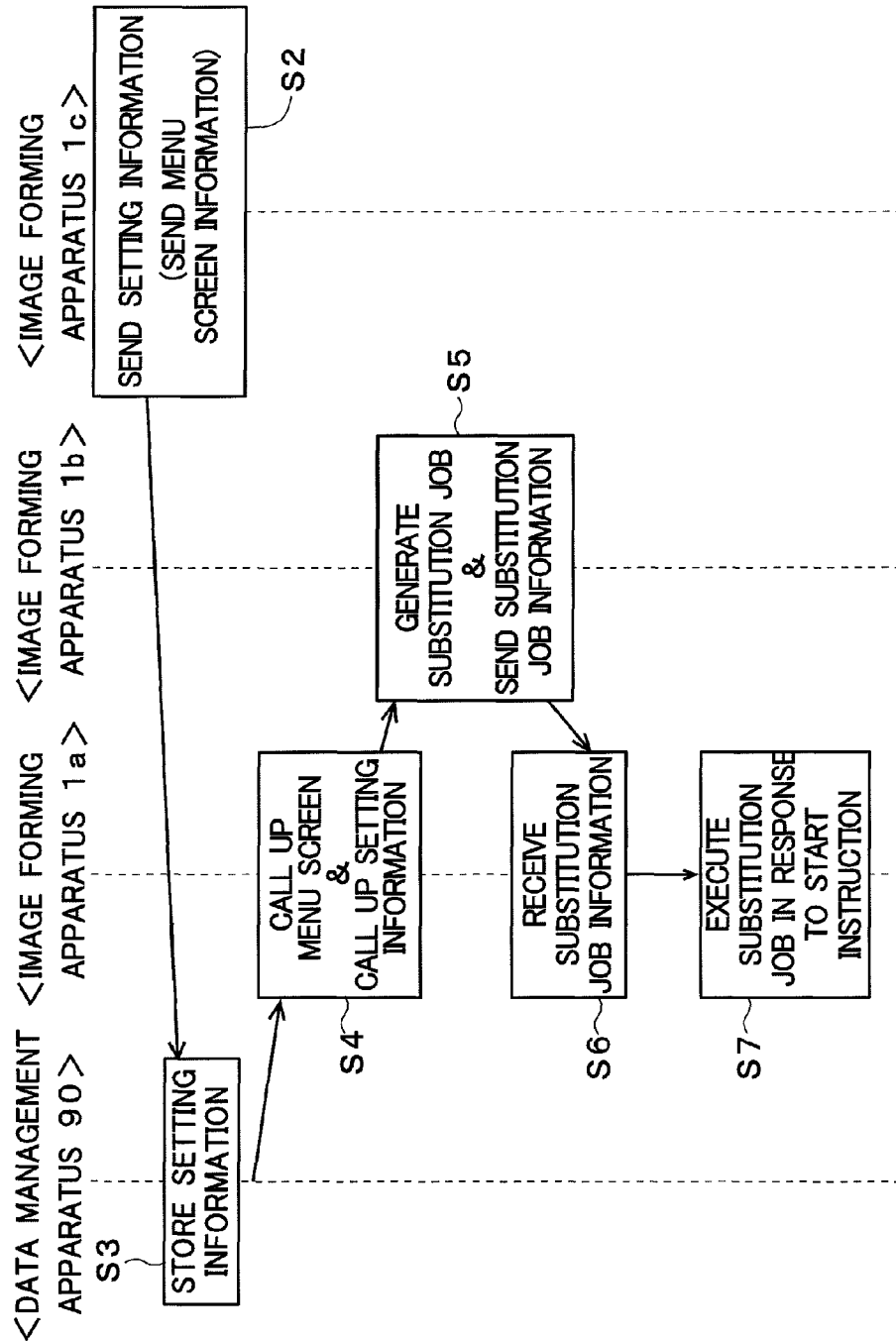
FIG. 9 is a view schematically showing an operation including a function converting operation.

FIG. 9 is a view schematically showing an operation including such a function converting operation.

Herein, it is assumed, as shown in FIG. 9, that the user UA first generates setting information and makes an entry of the setting information in the image forming apparatus 1c and the setting information is forwarded to and stored into the data management apparatus 90 (Steps S2 and S3).

In subsequent Step S4, as discussed above, when the user UA logs in the image forming apparatus 1a and presses the "Mode Entry/Call" button BN5 (FIG. 5), the image forming apparatus 1a displays the screen GAa (see FIG. 11) (the buttons BN41 to BN52 are not displayed yet) on the operation panel 63a. When the user UA further presses the button BN31 on the operation panel 63a, the image forming apparatus 1a communicates with the data management apparatus 90 to receive the customized information relating to the user UA from the data management apparatus 90. Then, the image forming apparatus 1a displays the buttons BN41 to BN52 in the screen GAa on the basis of the received customized information. As a result, the screen GAa shown in FIG. 11 is displayed on the operation panel 63a of the image forming apparatus 1a.

Figure 19:
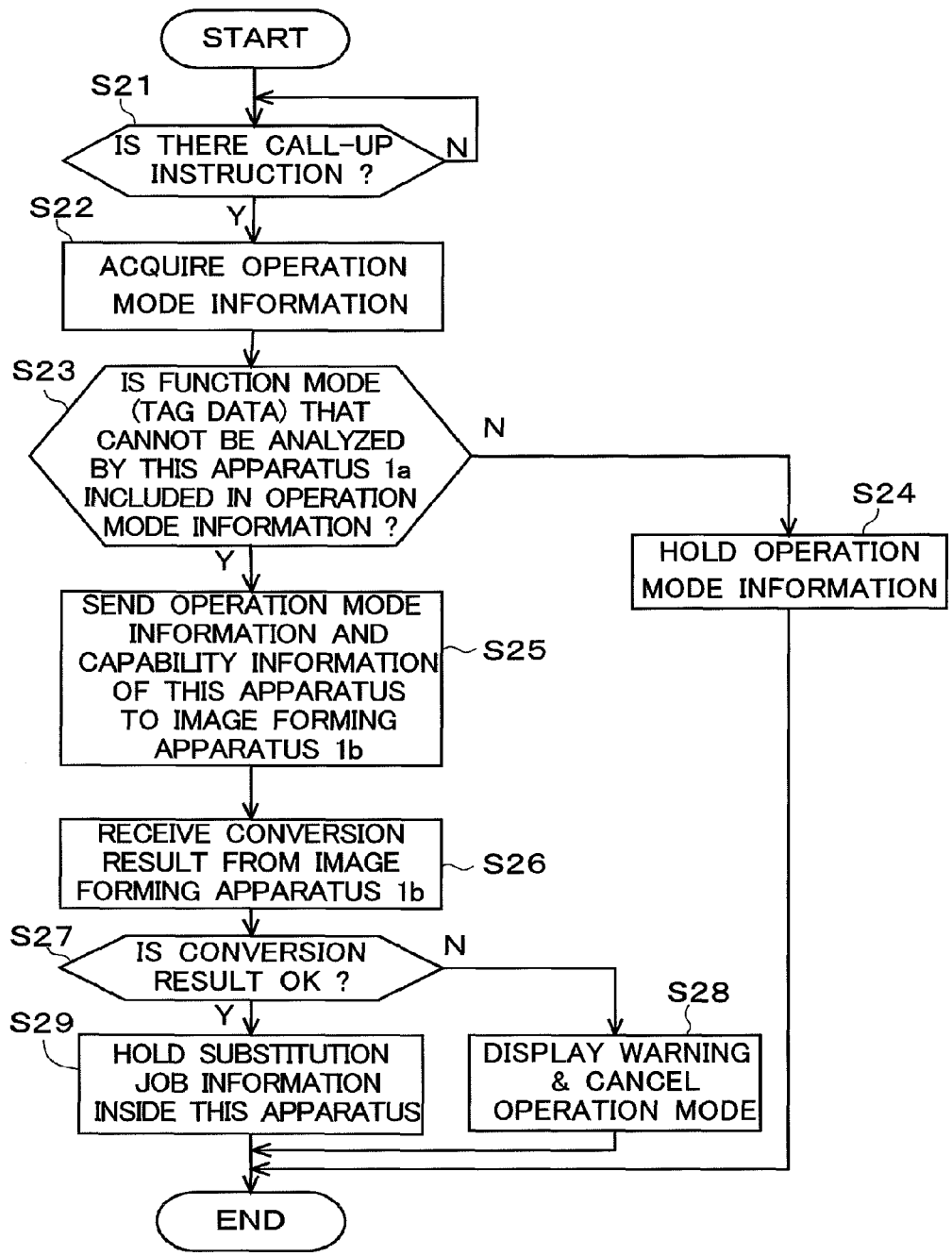
FIG. 19 is a flowchart showing part of an operation flow in an image forming apparatus (low function apparatus)
Figure 20:
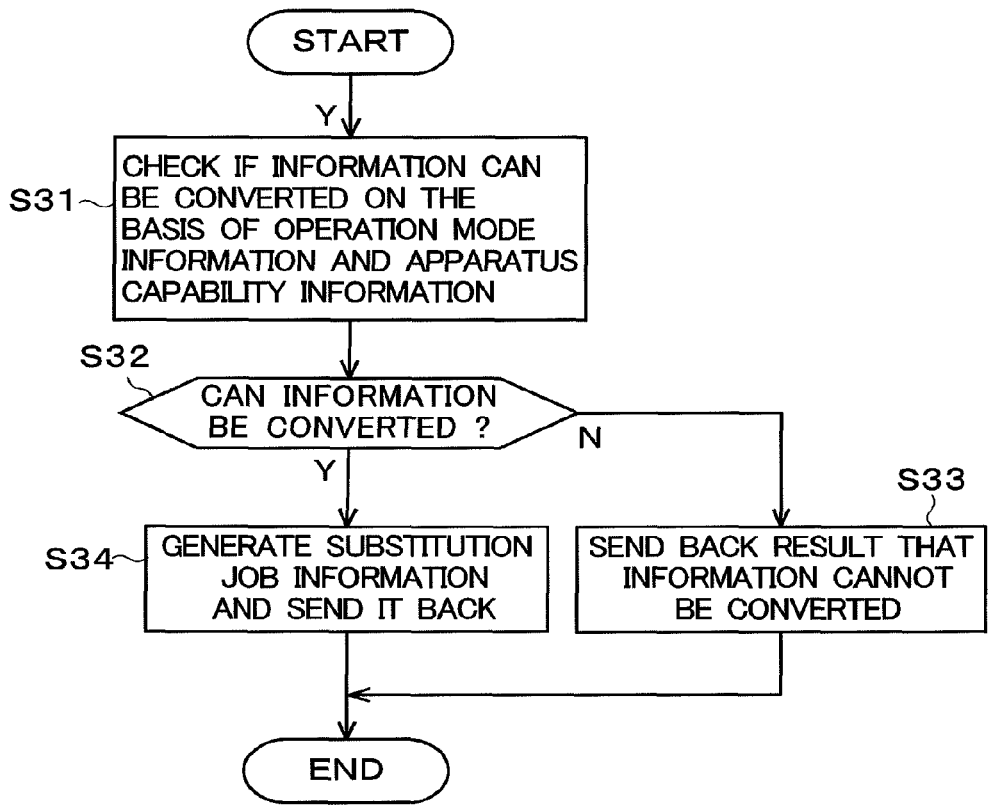
FIG. 20 is a flowchart showing part of an operation flow of an image forming apparatus (information converter)

Hereinafter, the following operation will be discussed with reference to FIGS. 19 and 20. Specifically, discussion will be made on a case where in response to the pressing of the button BN44 in the screen GAa (FIG. 11) of the image forming apparatus 1a, a call-up instruction (execution preparing instruction) for an operation relating to the "Job JD" is given. FIG. 19 is a flowchart showing part of an operation flow of the image forming apparatus 1a (low function apparatus), and in other words, a flowchart showing an operation corresponding to Steps S4 and S6 of FIG. 9. FIG. 20 is a flowchart showing part of an operation flow of the image forming apparatus 1b (referred to as an information converter or a mode conversion apparatus), and in other words, a flowchart showing an operation corresponding to Step S5 of FIG. 9.

When the user UA presses the button BN44 on the operation panel 63a of the image forming apparatus 1a, the image forming apparatus 1a detects that an operation mode MA4 corresponding to the "Job JD" set to the button BN44 is called up. Then, when it is detected that the operation mode MA4 corresponding to the "Job JD" is called up in Step S21 of FIG. 19, the process goes to Step S22.

In Step S22, the image forming apparatus 1a (in detail, the operation mode call part 12 and the mode information sending/receiving part 14 thereof) acquires therein the operation mode information MJ4 (FIG. 10) received from the data management apparatus 90. Herein, it is assumed that when pieces of information on the buttons BN41 to BN52 are acquired, pieces of operation mode information corresponding to these buttons are received by the image forming apparatus 1a and the operation mode information MJ4 corresponding to the "Job JD" (the button BN44) is extracted and acquired out of a plurality of operation mode information which are received. This is, however, only an exemplary case, and the image forming apparatus 1a may communicate with the data management apparatus 90 to acquire the operation mode information MJ4 in Step S22.

In next Step S23, the image forming apparatus 1a (in detail, the operation mode analysis part 13 thereof) determines whether or not the content (function mode or the like) which cannot be executed in the apparatus 1a is included in the operation mode information MJ4. In other words, the image forming apparatus 1a determines whether or not a specific function mode which is installed in the image forming apparatus 1c and not installed (yet) in the image forming apparatus 1a is included in the operation mode information MJ4 in the customized information.

In more detail, the image forming apparatus 1a determines whether or not each function mode included in the operation mode information MJ4 is installed in the image forming apparatus 1a, on the basis of information on the functional level (hereinafter, referred to also as "functional level information") of the image forming apparatus 1a. More specifically, the image forming apparatus 1a makes the determination on the basis of whether or not the operation mode information MJ4 described in the XML format includes unanalyzable tag information. Herein, it is assumed that the functional level information is stored inside this apparatus (the image forming apparatus 1a). The "functional level information" may be referred to also as "possessed-function information" which is information on the functions possessed by the image forming apparatus 1a.

As shown in FIG. 3, the image forming apparatus 1a is an apparatus of the functional level L2 and has the functions of "N in 1" and the like but does not have the function mode of "continuous copy mode". On the other hand, as shown in FIG. 10, the description "<Multi-tray-copy>tray=1, tray=2, tray=3, tray=4, tray=5</Multi-tray-copy>" (tag information TG41) relating to the operation to be executed in the function mode of "continuous copy mode" is included in the operation mode information MJ4 described in the XML format (see FIG. 10). In other words, the operation mode information MJ4 includes the tag information TG41 which cannot be analyzed by the image forming apparatus 1a. In such a case, the image forming apparatus 1a determines that the tag information TG41 which cannot be analyzed by this apparatus is included in the operation mode information MJ4 and detects the tag information TG41 as "unanalyzable tag information" ("Y" (YES) in Step S23). In the present specification, the "tag information" means information described with tags. Particularly, information including a character string (<Multi-tray-copy>) parenthesized by a pair of signs "<" and ">" is referred to as "tag information" and information (TG41 and the like) including a character string sandwiched between a pair of tags (e.g., "<Multi-tray-copy>" and "</Multi-tray-copy>") is also referred to as "tag information".

Detecting the tag information TG41 as "unanalyzable tag information", the image forming apparatus 1a sends a conversion request (conversion request data) indicating that the operation mode information should be converted to the image forming apparatus 1b. Specifically, the image forming apparatus 1a (in detail, the operation mode analysis part 13, the mode information sending/receiving part 14, and the like thereof) sends the operation mode information MJ4 including the tag information TG41, and the like, as the conversion request data (or with the conversion request data) to the image forming apparatus 1b (Step S25). The image forming apparatus 1a also sends capability information MB indicating the performance (capability) and the like of this apparatus to the image forming apparatus 1b. The capability information MB has, for example, functional level information MC relating to the functions of this apparatus (the image forming apparatus 1a) and information MD relating to the apparatus configuration (including an optional configuration and the like) (the information is referred to also as "apparatus configuration information"). The functional level information MC includes information indicating which of the functional levels L1 to L5 the functional level of this apparatus is, and the like and the apparatus configuration information MD includes information indicating the number of trays provided in this apparatus, and the like.

If there is no unanalyzable tag information in the operation mode information MJ4, or in other words, if all of the operation mode information MJ4 are analyzable ("N" (NO) in Step S23), the process goes to Step S24, and the image forming apparatus 1a holds the operation mode information MJ4. When the operation of Step S24 is finished, the process goes to the next operation of job control (see Step S7 of FIG. 9).

In the case where the unanalyzable tag information TG41 is included in the operation mode information MJ4, when the tag information TG41 and the like are sent to the image forming apparatus 1b (in Step S25 of FIG. 19), the image forming apparatus 1b executes such an operation as shown in the flowchart of FIG. 20 (which corresponds to the operation of Step S5 shown in FIG. 9).

As shown in FIG. 20, the image forming apparatus 1b (in detail, the mode information sending/receiving part 14, the mode information conversion part 15, and the like thereof) first determines whether or not the tag information included in the operation mode information MJ4 can be converted on the basis of the information MJ4 and MB received from the image forming apparatus 1a in Step S31.

In more detail, particularly on the basis of the functional level information MC out of the capability information MB of the image forming apparatus 1a which is a sender, it is detected whether or not there is a tag which cannot be analyzed by the image forming apparatus 1a and determined whether to convert each tag information.

In the above operation, it is detected, for example, that the tag information TG41 out of the pieces of tag information shown in FIG. 10 is tag information corresponding to the function mode (specifically, the "continuous copy mode") which cannot be analyzed by the image forming apparatus 1a of the functional level L2.

Then, the image forming apparatus 1b determines whether or not the "continuous copy mode" can be converted into a plurality of jobs. In other words, it is determined whether or not a converting function (an operation mode converting function and the like) of the image forming apparatus 1b can respond to the "continuous copy mode". Specifically, it is determined whether or not it is possible for the image forming apparatus 1b to convert the tag information TG41 of the "continuous copy mode" into tag information formed of a combination consisting of a plurality of jobs (discussed later). In more detail, the image forming apparatus 1b determines whether or not this apparatus has a converting function for the continuous copy mode. Herein, it is assumed that the image forming apparatus 1b has the converting function for the continuous copy mode.

If the image forming apparatus 1b has the converting function for the continuous copy mode (the conversion result is good), the process goes to Step S34. In Step S34, such a conversion as discussed later is performed on the basis of a conversion database DB (discussed later) and the like and operation mode information MR4 (, MS4) including converted tag information TR41 (, TS41) is sent from the image forming apparatus 1b to the image forming apparatus 1a. In other words, the operation mode information including a plurality of converted job information is sent back.

On the other hand, if the image forming apparatus 1b does not have the converting function for the continuous copy mode (the conversion result is not good), the process goes to Step S33. In Step S33, a message that the mode conversion is impossible is sent from the image forming apparatus 1b to the image forming apparatus 1a.

The conversion in Step S34 is performed by the mode information conversion part 15 and the like of the image forming apparatus 1b and the sending (returning) operation in Steps S33 and S34 is performed by the mode information sending/receiving part 14 and the like of the image forming apparatus 1b.

Next, the conversion and the like in Step S34 will be discussed.

For example, the original tag information TG41 is converted into the tag information TR41 (see FIG. 12) which can be analyzed by the image forming apparatus 1a and the original operation mode information MJ4 is converted into the operation mode information MR4 (see FIG. 12) which can be analyzed by the image forming apparatus 1a.

FIG. 12 is a view showing the converted operation mode information MR4. As shown in FIG. 12, the converted operation mode information MR4 includes the converted tag information TR4. The executing operation described in the original tag information TG41 is divided into the following seven jobs (described in an area sandwiched between the tag "<Multi-tray-copy>" and the tag "</Multi-tray-copy>") and reconstructed by the seven jobs. Specifically, the original tag information TG41 is converted into the new tag information TR41 relating to the seven jobs. As shown in FIG. 13, the seven jobs are the following jobs B1 to B7:

(B1) "BOX Storage": store an image (scan image) acquired by a scan operation into a predetermined box (e.g., a system box) as a temporary file (file name="temp20090921180125", (B2) "BOX Call": select the tray TL1 and print the temporary file, (B3) "BOX Call": select the tray TL2 and print the temporary file, (B4) "BOX Call": select the tray TL3 and print the temporary file, (B5) "BOX Call": select the tray TL4 and print the temporary file, (B6) "BOX Call": select the tray TL5 and print the temporary file, and (B7) "BOX Document Edit": delete the temporary file in the box.

These jobs B1 to B7 are described in the XML format, for example, as shown in FIG. 12. More specifically, the jobs B1 to B7 are described as:
(B1)<Scan-to-box>filename=temp20090921180125</Scan-to-box>, (B2)<Box-to-print>filename=temp20090921180125, tray=1</Box-to-print>, (B3)<Box-to-print>filename=temp20090921180125, tray=2</Box-to-print>, (B4)<Box-to-print>filename=temp20090921180125, tray=3</Box-to-print>, (B5)<Box-to-print>filename=temp20090921180125, tray=4</Box-to-print>, (B6)<Box-to-print>filename=temp20090921180125, tray=5</Box-to-print>, (B7)<Box-file-delete>filename=temp20090921180125, attribute=not_delete</Box-file-delete>.

Thus, having received the conversion request from the image forming apparatus 1*a*, the image forming apparatus 1*b* (the mode information conversion part 15) divides the operation to be executed correspondingly to the "continuous copy mode (multitray mode)" into a plurality of jobs (B1 to B7). Then, the image forming apparatus 1*b* converts the execution information (in detail, the tag information TG41) of the "continuous copy mode" into converted execution information (in detail, the tag information TR41) described by using a combination of the pieces of execution information of a plurality of jobs (B1 to B7). In short, the original tag information TG41 is converted into the new tag information TR41. The original operation mode information MJ4 is converted into the new operation mode information MR4.

Then, when the image forming apparatus 1*a* executes the jobs B1 to B7 described in the tag information TR41 of the operation mode information MR4, the same function as that of the "continuous copy mode" is implemented in the image forming apparatus 1*a*. In other words, the customized information customized for a specific user in the image forming apparatus 1*c* or the like can be used in another image forming apparatus 1*a*.

In this case, the converted tag information TR41 is very useful when the number of trays in the image forming apparatus 1*a* is not smaller than the number of trays in the image forming apparatus 1*c* (five or more).

When the number of trays provided in the image forming apparatus 1*a* is three and the trays TL4 and TL5 are not present in the image forming apparatus 1*a*, however, the above-discussed conversion is not always sufficient. For this reason, it is preferable that the number of trays in the image forming apparatus 1*a* should be taken into consideration.

Hereinafter, discussion will be made on a case where the above conversion is performed by using not only the functional level information MC but also the apparatus configuration information MD among the capability information MB of the image forming apparatus 1*a* which gives the conversion request. In more detail, by using also the information on the number of trays included in the apparatus configuration information MD, it is determined whether or not the five trays TL1 to TL5 included in the tag information TG41 are provided in the image forming apparatus 1*a*. Then, if it is determined that the number of trays provided in the image forming apparatus 1*a* is short, such tag information TS41 (another tag information TS41 which can be analyzed by the image forming apparatus 1*a*) as described below, using also a user intervention function, is generated. In other words, the tag information TG41 is converted into the tag information TS41. The "user intervention function" is a function using the intervention of the user. As the user intervention function, for example, used is a function for once changing the state of the apparatus into a standby state and thereafter waiting until user's operation of changing paper or the like (user intervention) is finished.

FIG. 14 is a view showing the converted operation mode information MS4. As shown in FIG. 14, the converted operation mode information MS4 includes the converted tag information TS41. The executing operation described in the original tag information TG41 is divided into the following eight jobs (described in an area sandwiched between the tag "<Multi-tray-copy>" and the tag "</Multi-tray-copy>") and reconstructed by the eight jobs. Specifically, the original tag information TG41 is converted into the new tag information TS41 relating to the eight jobs. As shown in FIG. 15, the eight jobs are the following jobs B1 to B8:
(E1) "BOX Storage": store an image (scan image) acquired by a scan operation into a predetermined box (e.g., a system box) as a temporary file (file name="temp20090921180125", (E2) "BOX Call": select the tray TL1 and print the temporary file, (E3) "BOX Call": select the tray TL2 and print the temporary file, (E4) "BOX Call": select the tray TL3 and print the temporary file, (E5) "User Intervention Function": display "PLEASE CHANGE PAPER IN THE TRAYS 1 & 2 TO DESIRED PAPER. WHEN READY, PLEASE PRESS THE START KEY." on the operation panel; Start when the start key is pressed, (E6) "BOX Call": select the tray TL1 and print the temporary file, (E7) "BOX Call": select the tray TL2 and print the temporary file, and (E8) "BOX Document Edit": delete the temporary file in the box.

Figure 16:
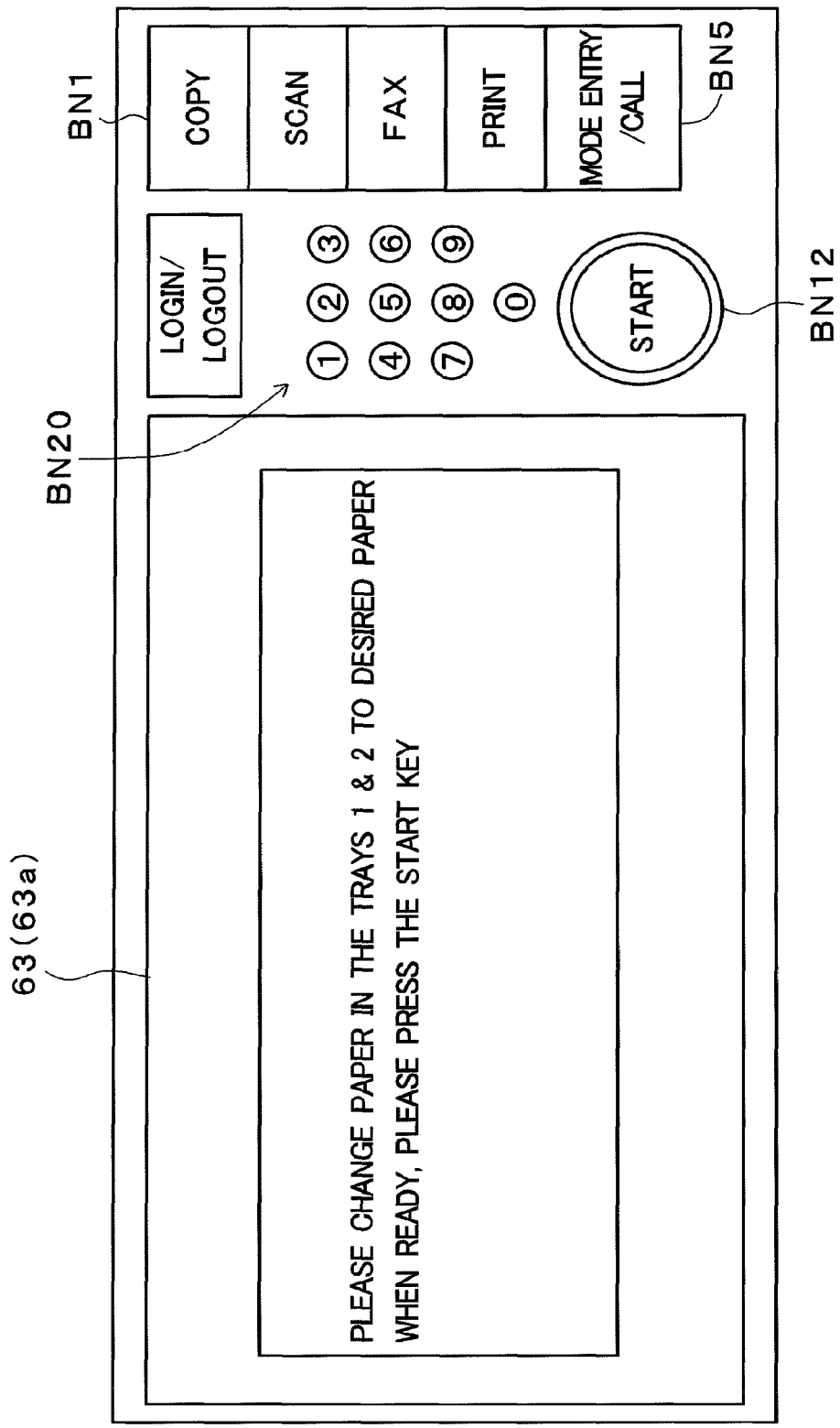
FIG. 16 is a view showing a display screen used for a user intervention function.

These jobs are to sequentially execute the following operations. Specifically, the job E1 is a job for storing the scan image into a box (job E1). The following jobs E2, E3, and E4 are jobs for printing the scan image in the box on the paper in the trays TL1, TL2, and TL3, respectively. The next job E5 is a job for performing the user intervention function, i.e., a job for displaying such a screen as shown in FIG. 16 on the operation panel 63*a* and thereafter waiting for the input of the start key. The screen is displayed after the end of the job E4. In accordance with the instruction of the screen, the user changes the paper in the trays TL1 and TL2 and presses the start key again, to thereby continue the process. Further, the jobs E6 and E7 are jobs for printing the scan image in the box on the paper in the trays TL1 and TL2, respectively, after the input of the start key. The job E8 is a job for deleting the scan image which is temporarily stored in the box.

These jobs B1 to B8 are described in the XML format, for example, as shown in FIG. 14. More specifically, the jobs B1 to B8 are described as:
(E1)<Scan-to-box>filename=temp20090921180125</Scan-to-box>, (E2)<Box-to-print>filename=temp20090921180125, tray=1</Box-to-print>, (E3)<Box-to-print>filename=temp20090921180125, tray=2</Box-to-print>, (E4)<Box-toprint>filename=temp20090921180125, tray=3</Box-to-print>, (E5)<Wait-operation>print_string="PLEASE CHANGE PAPER IN THE TRAYS1 & 2 TO DESIRED PAPER. WHEN READY, PLEASE PRESS THE START KEY.", wait=start_key, (E6)<Box-to-print>filename=temp20090921180125, tray=1</Box-to-print>, (E7)<Box-to-print>filename=temp20090921180125, tray=2</Box-to-print>, (E8)<Box-file-delete>filename=temp20090921180125, attribute=not_delete</Box-file-delete>.

Further, the file name of the temporary box may be automatically determined by the image forming apparatus 1b.

In this case, it is assumed that the image forming apparatus 1b has the conversion database DB relating to the function modes therein in advance. The conversion database DB defines the correspondence between the execution information of each function mode and a plurality of jobs after the conversion in advance. For example, as to the continuous copy mode, conversion data (referred to also as a conversion program) with the number of trays (required trays) to be used in the continuous copy mode and the number of trays provided in the apparatus (image forming apparatus 1a) which performs this mode as an input parameter (variables) is stored in advance. Then, in accordance with the number of required trays and the number of provided trays, such a description in the XML format as discussed above is automatically outputted. Specifically, the number of required trays is calculated on the basis of the original tag information TG41 and compared with the number of trays provided in the image forming apparatus 1a. Then, when the number of required trays is not larger than the number of provided trays, the converted execution information not including the user intervention function (the tag information TR41 or the like) is generated. On the other hand, when the number of required trays is larger than the number of provided trays, the converted execution information including the user intervention function (the tag information TS41 or the like) is generated. Thus, the converted tag information TS41 (or TR41) is generated from the original tag information TG41.

Thus, the original tag information TG41 is converted into the new tag information TS41 and the original operation mode information MJ4 is converted into the new operation mode information MS4.

Referring back to FIG. 19, when the image forming apparatus 1a receives the conversion result from the image forming apparatus 1b (Step S26), a branch operation in accordance with the conversion result is performed.

Receiving the operation mode information MS4 (or MR4 or the like)—including the converted tag information TS41 (or TR41 or the like), the image forming apparatus 1a holds the operation mode information therein (stores the operation mode information into a temporary memory or the like) ("Y" in Step S27, then Step S29) and completes the process of this flowchart (END). On the other hand, receiving a result report indicating that the conversion result is not good (in detail, the conversion cannot be performed) ("N" in Step S27), the image forming apparatus 1a displays a warning screen (not shown) indicating that a specified operation (an operation specified by pressing the button BN44) cannot be executed on the operation panel 63a. The image forming apparatus 1a further cancels the specification of the specified operation mode (Step S28) and completes the process of this flowchart (END).

Figure 17:
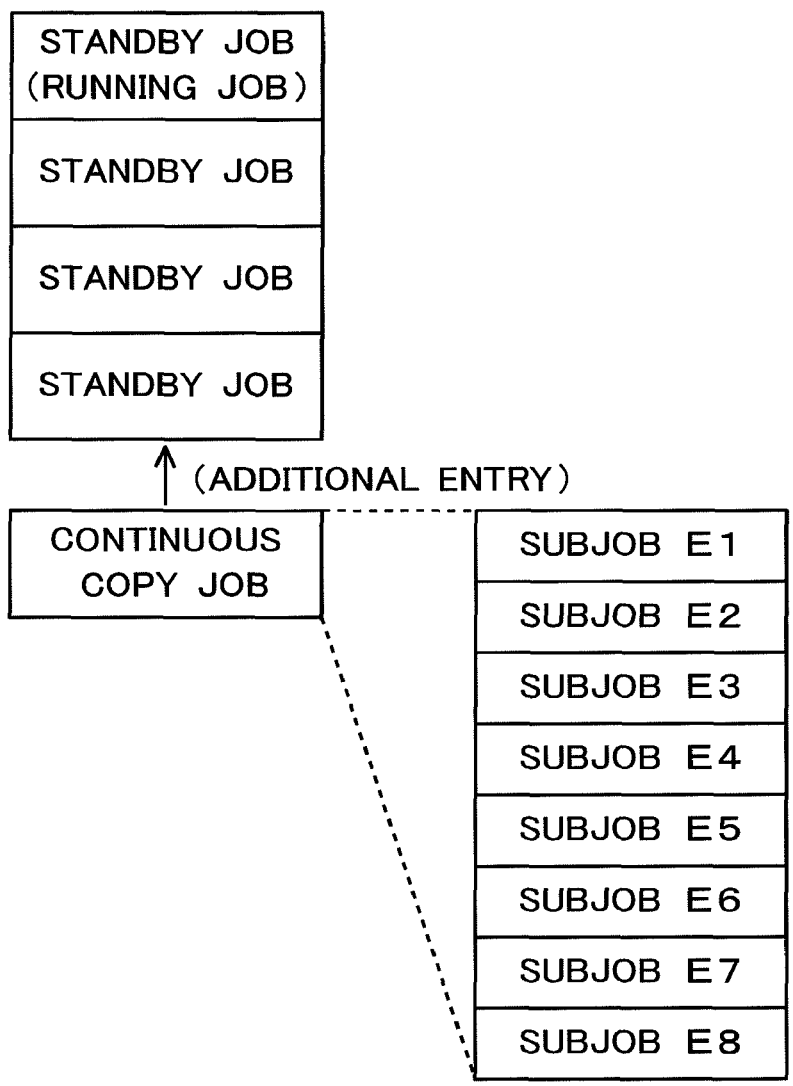
FIG. 17 is a view showing additional entry of continuous copy job into a job queue.

After Step S29, the operation of Step S7 shown in FIG. 9 is performed. Specifically, first, the image forming apparatus 1a makes an additional entry of the jobs based on the operation mode information MS4 (or MR4) or the like into a job queue (see FIG. 17). Then, in accordance with the order of execution, the jobs are sequentially executed. For example, the eight jobs E1 to E8 included in the operation mode information MS4 are registered additionally to the existing waiting jobs. When the time to execute the eight jobs E1 to E8 comes, the eight jobs E1 to E8 are sequentially executed. The job entry operation, the job execution control operation, and the like are performed by the job control part 16 of the image forming apparatus 1a.

Figure 21:
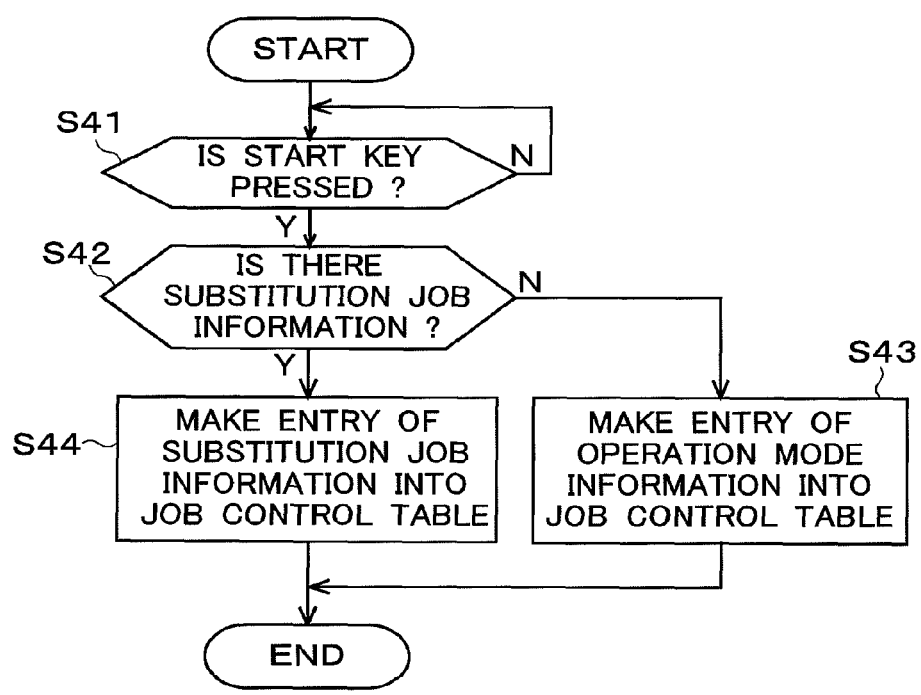
FIG. 21 is a flowchart showing part of the operation flow in the image forming apparatus (low function apparatus)

FIG. 21 is a flowchart showing the job entry operation. The job entry operation shown in FIG. 21 is performed after Steps S29 and S24 in the flowchart of FIG. 19. As shown in FIG. 21, first, when the image forming apparatus 1a detects that the start key (start button) BN12 is pressed, it is determined that an execution instruction for a call-up job (in detail, a job corresponding to the operation mode information called up in response to the pressing of the button BN44 and the like) is given, and the process goes to Step S42. In Step S42, it is determined whether such a substitution job as above (the converted operation mode information (MS4, MR4, or the like)) is acquired or not. If the converted operation mode information (substitution job) is acquired, the substitution job described in the converted operation mode information is additionally registered into a job control table (Step S44). On the other hand, if the converted operation mode information (substitution job) is not acquired (the original tag information does not need to be converted), the original operation mode information (MJ4 or the like) is additionally registered into the job control table as information on the next job (Step S44).

In the above operation, the image forming apparatus 1a sends the conversion request to the image forming apparatus 1b (information converter) if a specific function mode which this apparatus cannot perform is included in the customized information (Step S25 of FIG. 19). Receiving the conversion request from the image forming apparatus 1a, the image forming apparatus 1b (the mode information conversion part 15) divides the operation to be executed in the "continuous copy mode (multitray mode)" into the plurality of jobs E1 to E8. Then, the image forming apparatus 1b converts the execution information (in detail, the tag information) of the "continuous copy mode" into the converted execution information described by using the combination of pieces of execution information of the jobs E1 to E8 (Step S34). After that, when the operation relating to the jobs E1 to E8 are performed by the image forming apparatus 1a in accordance with the description of the tag information TS41 in the operation mode information MS4, the same function as that of the "continuous copy mode" is implemented also in the image forming apparatus 1a.

Therefore, according to the above aspect, the customized information which is customized for a specific user in the image forming apparatus 1c or the like can be used also in another image forming apparatus 1a. Specifically even if a specific function mode in the customized information is not installed in an image forming apparatus (1a), the same function can be implemented in the image forming apparatus (1a). In other words, the operation setting information customized for a specific user can be easily used by a plurality of image forming apparatuses (1a, 1c, and the like).

Figure 18:
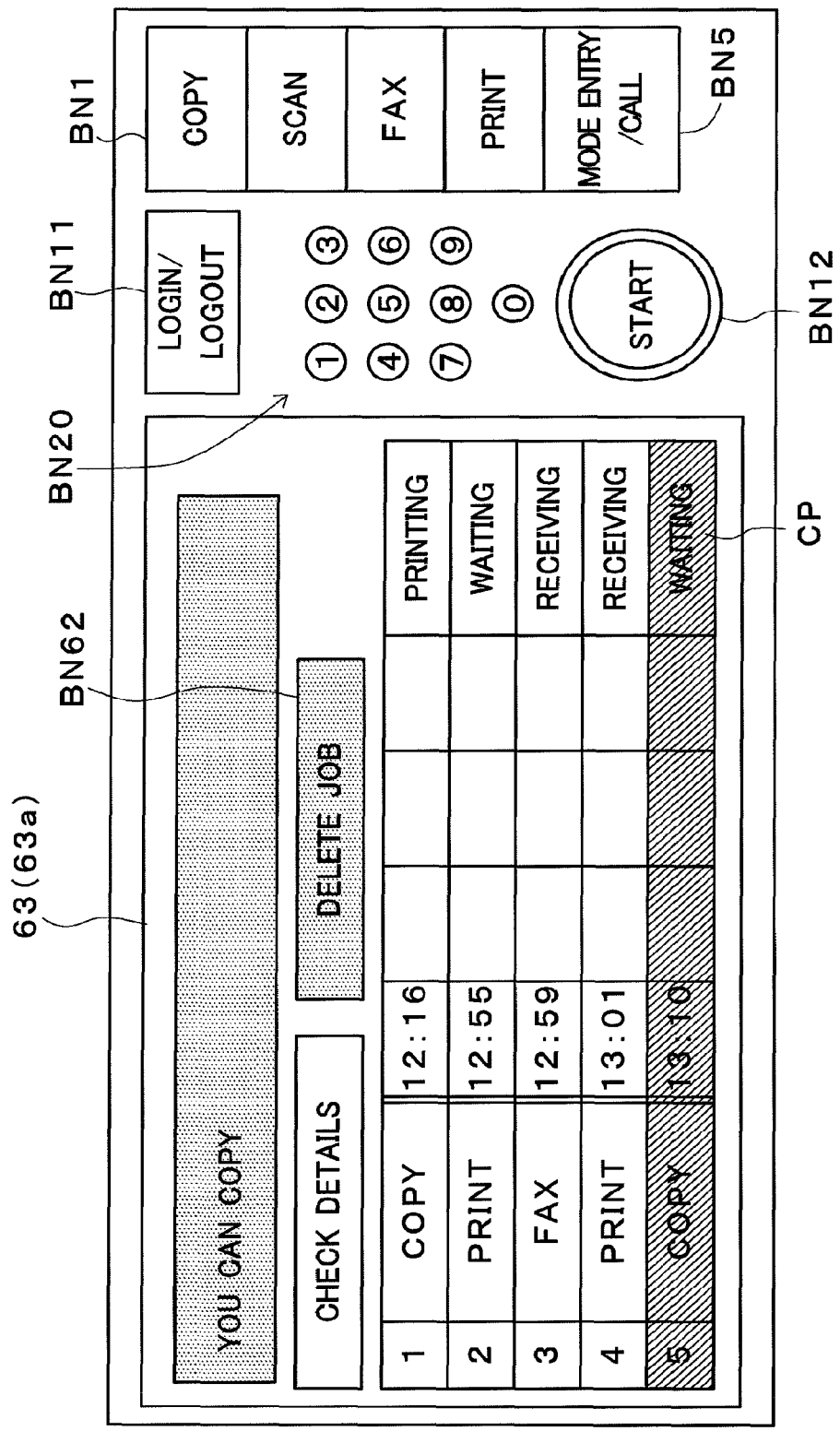
FIG. 18 is a view showing a running job check screen.

It is preferable that the job registered in the job queue can be deleted (interrupted) during waiting period or during execution. It is assumed, for example, that a copy job in the above-discussed continuous copy mode is registered as the fifth job (together with other four jobs) in such an entry job check screen as shown in FIG. 18. In this case, it has only to be so configured that the copy job can be deleted when a part CP which corresponds to the copy job in the fifth stage is pressed by a finger of the user for selection and thereafter a job delete button BN62 is pressed. Further, in this case, it is desirable that the above jobs E1 to E8 should be treated systematically. In other words, it is desirable that the plurality of jobs E1 to E8 should be treated systematically as a plurality of subjobs relating to the "continuous copy job". When an instruction that the copy job (continuous copy job) should be deleted is received after the execution of the subjob E1 and before the execution of the subjob E7, it is desirable that the subjobs other than the subjob E8 should be deleted while the subjob E8 should be left, not being deleted. It is thereby possible to surely delete the temporary file by executing the subjob E8. The description "attribute=not_delete" (see FIG. 14) in the subjob E8 indicates the above operation.

Further, it is desirable that an operation of changing the order of execution of a job and another job, and the like, can be performed. Also in such a case, it is desirable that the plurality of jobs E1 to E8 should be treated systematically. In other words, it is desirable that the plurality of jobs E1 to E8 should be treated systematically as a plurality of subjobs relating to the continuous copy job. When the order of execution is changed, particularly, it is desirable that the order of execution of the jobs E1 to E8 should be treated in a single unit lest the other job is inserted among the jobs E1 to E8. For example, when a condition that a predetermined tray used in the job to be executed is empty of paper is satisfied, the next job may overtake the job to be executed and be preferentially executed ahead (an overtaking operation). Also in an apparatus in which such an overtaking operation is allowed, it is desirable that the overtaking operation is inhibited during the execution of the "continuous copy job".

<4. Other Function Modes>

Though discussion has been made above on the case where the image forming apparatus 1a in which the "continuous copy mode" is not installed implements the same function as that of the "continuous copy mode" by using the operation mode converting function of the image forming apparatus 1b (information converter), this is only one exemplary case. Also in the other function modes (e.g., the "enlarged continuous copy mode", the "card copy mode", and the like), similarly, the above-discussed principle can be applied.

<Enlarged Continuous Copy Mode>

Figure 22:
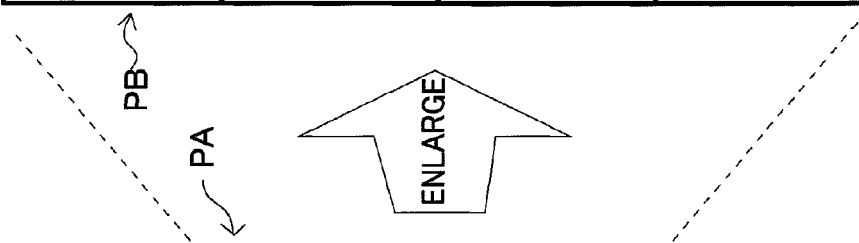
FIG. 22 is a view illustrating an "enlarged continuous copy mode"

The "enlarged continuous copy mode" is a mode for generating a copy of which the size is larger than that of paper by dividing an original manuscript into a plurality of partial areas and sequentially performing enlarged copying of the plurality of partial areas. As shown in FIG. 22, for example, by joining a plurality of pieces of A4-sized paper obtained by copying partial areas of an A3-sized original manuscript PA, an A1-sized copy PB can be generated.

In more detail, first, the original manuscript PA is divided into a plurality of (e.g., sixteen) partial areas PT1 to PT16. Then, enlarged copying is sequentially performed for the plurality of partial areas PT1 to PT16 at a predetermined magnification (e.g., a magnification of 200%) onto A4 paper. More specifically, the partial area PT1 of the original manuscript PA is first cropped out and the partial area PT1 is enlargedly copied at a predetermined magnification onto the first A4 paper. Next, the partial area PT2 of the original manuscript PA is cropped out and the partial area PT2 is enlargedly copied at a predetermined magnification onto the second A4 paper. Further, the partial area PT3 of the original manuscript PA is cropped out and the partial area PT3 is enlargedly copied at a predetermined magnification onto the third A4 paper. Then, the partial area PT4 of the original manuscript PA is cropped out and the partial area PT4 is enlargedly copied at a predetermined magnification onto the fourth A4 paper. After that, the same operation is repeated, where the partial area PTi (i=1, . . . , 16) of the original manuscript PA is cropped out and the partial area PTi is enlargedly copied at a predetermined magnification onto the i-th A4 paper. Thus, the "enlarged continuous copy mode" is implemented by the combination of the cropping (trimming) function and the enlargement function.

As shown in FIG. 3, however, the "enlarged continuous copy mode" is installed in the higher-level models of which the functional level is L3 or higher but not installed in the lower-level models of which the functional level is L2 or lower. In this case, when the operation mode set in the screen GAc of the image forming apparatus 1c of the functional level L4 includes the "enlarged continuous copy mode", the image forming apparatus 1a of the functional level L2 cannot implement the same function as that of the "enlarged continuous copy mode".

For this reason, the above-discussed principle is applied in this situation, it is desirable that the "enlarged continuous copy mode" should be reconstructed by the combination of predetermined functions. Specifically, the "enlarged continuous copy mode" may be implemented by using the functions (in detail, the "trimming" function, the "enlargement" function, and the like) possessed by the image forming apparatus 1a.

In more detail, receiving the conversion request from the image forming apparatus 1a, the image forming apparatus 1b (the mode information conversion part 15) divides the operation to be executed in the "enlarged continuous copy mode" into a plurality of jobs (specifically, the "trimming+enlargement" jobs). Then, the image forming apparatus 1b converts the execution information (in detail, the tag information) of the "enlarged continuous copy mode" into the converted execution information (in detail, the tag information) described by using the combination of pieces of execution information of the plurality of jobs (the "trimming+enlargemont" jobs).

For example, in the converted execution information, an integrated operation of the operation of cropping out the partial area PTi of the original manuscript PA and the operation of enlargedly copying the partial area PTi at a predetermined magnification onto the i-th A4-sized paper is described as the i-th job Ji. It is also described that the job Ji should be repeated sixteen times.

The image forming apparatus 1a receives such converted execution information from the image forming apparatus 1b and performs the job corresponding to the converted execution information, to thereby implement the same function as that of the "enlarged continuous copy mode".

According to the above aspect, the customized information which is customized for a specific user in the image forming apparatus 1c or the like can be used also in another image forming apparatus 1a.

<Card Copy Mode>

The "card copy mode" is a copy mode in which the front and back sides of a card-like original such as a driver's license are copied and images of both the sides are placed in one piece of paper.

Figure 23:
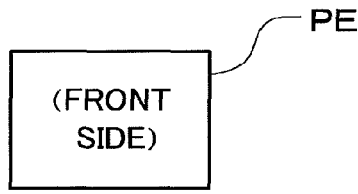
FIG. 23 is a view showing a front side of a card-like original manuscript.
Figure 24:
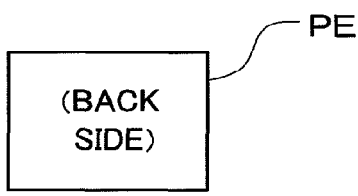
FIG. 24 is a view showing a back side of the card-like original manuscript.

In the card copy mode, a front side of a card-like original PE (see FIG. 23) and a back side of the card-like original PE (see FIG. 24) are sequentially scanned and a front side image and a back side image are generated. Then, the front side image and the back side image are printed out in one piece of paper, being vertically arranged (see FIG. 25).

Figure 25:
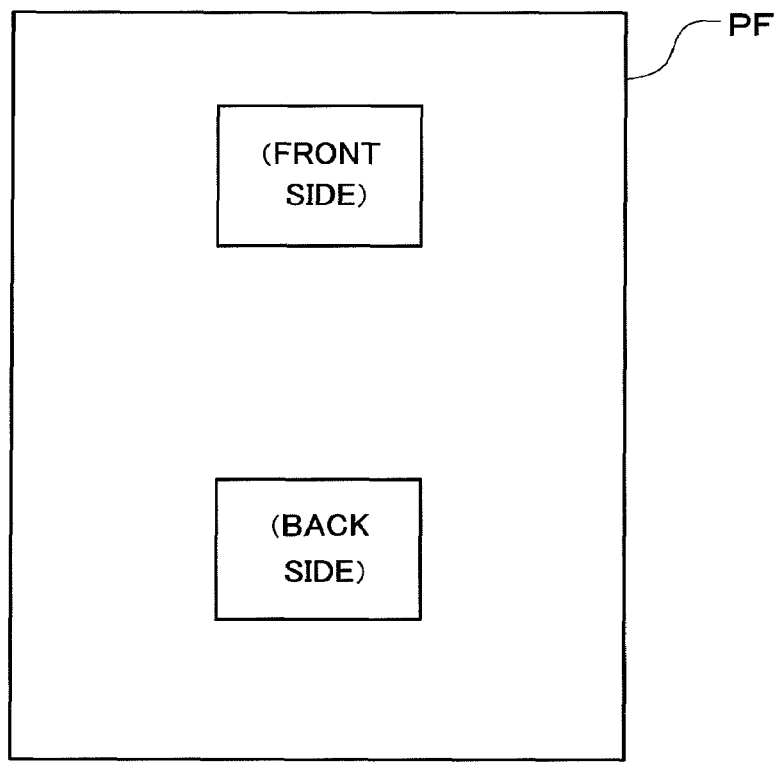
FIG. 25 is a view showing an exemplary print output (copy output) of a "card copy mode"
Figure 26:
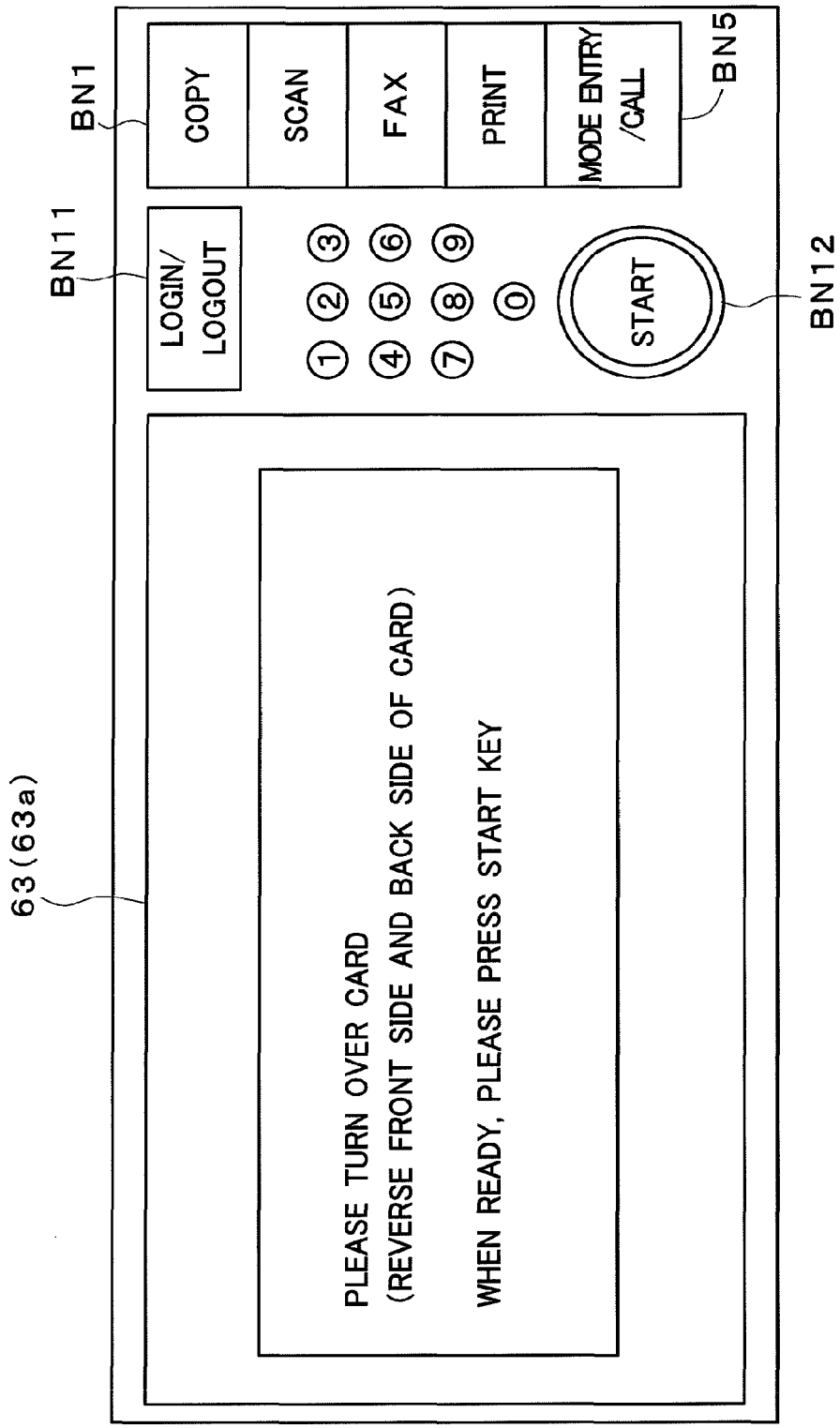
FIG. 26 is a view showing a display screen used for a user intervention function.

More specifically, the user first places the original manuscript PE on a document glass and has the image forming apparatus scan the front side of the original PE. After that, in accordance with such an instruction displayed in the screen as shown in FIG. 26, the user turns over the original (card) PE and places the original PE again on the document glass, and further has the image forming apparatus scan the back side of the original PE. Then, after a composite image in which the front side image and the back side image are arranged on the upper position and the lower position, respectively, is generated, the composite image is printed out (FIG. 25).

As shown in FIG. 3, however, the "card copy mode" is installed in the higher-level models of which the functional level is L4 or higher but not installed in the lower-level models of which the functional level is L3 or lower. In this case, when the operation mode set in the screen GAc of the image forming apparatus 1c of the functional level L4 includes the "card copy mode", the image forming apparatus 1a of the functional level L2 cannot implement the same function as that of the "card copy mode".

For this reason, the above-discussed principle is applied in this situation, it is desirable that the "card copy mode" should be reconstructed by the combination of predetermined functions. Specifically, the "card copy mode" may be implemented by using the functions (in detail, the "form overlay" function, the "user intervention" function, and the like) possessed by the image forming apparatus 1a.

In more detail, receiving the conversion request from the image forming apparatus 1a, the image forming apparatus 1b (the mode information conversion part 15) divides the operation to be executed in the "card copy mode" into a plurality of jobs (specifically, the front side scan job, the user intervention job, the back side scan job, and the form overlay printout job). Then, the image forming apparatus 1b converts the execution information (in detail, the tag information) of the "card copy mode" into the converted execution information (in detail, the tag information) described by using the combination of pieces of execution information of the plurality of jobs (the front side scan job, the user intervention job, the back side scan job, and the form overlay printout job).

For example, in the converted execution information, described are the tag information corresponding to the front side scan job, the tag information corresponding to the user intervention job, the tag information corresponding to the back side scan job, and the tag information corresponding to the form overlay printout job. In this case, the front side scan job is a job of scanning the front side of the original PE, and the back side scan job is a job of scanning the back side of the original PE. The user intervention job is a job of requesting user's intervention, in more detail, a job of requesting the user to reverse the front side and the back side of the original PE. In the user intervention job, such a screen as shown in FIG. 26 is displayed on the operation panel 63. The form overlay printout job is a job of laying out the front side image and the back side image at the respective specified positions in a form for card print made in advance and printing out the form.

The image forming apparatus 1a receives such converted execution information from the image forming apparatus 1b and performs the job corresponding to the converted execution information, to thereby implement the same function as that of the "card copy mode".

According to the above aspect, the customized information which is customized for a specific user in the image forming apparatus 1c or the like can be used also in another image forming apparatus 1a.

Though the "enlarged continuous copy mode" and the "card copy mode" have been discussed as exemplary cases herein, the above-discussed principle can be also applied to other function modes.

<Variations>

Though the preferred embodiment of the present invention has been discussed above, the present invention is not limited to the above-discussed preferred embodiment.

Though the image forming apparatus 1b responds to the call-up of each operation mode and performs the conversion of the operation mode corresponding to the call-up, or the like, in the above-discussed preferred embodiment, for example, this is only one exemplary case. The conversion or the like may be performed collectively for a plurality of operation modes registered in relation to the user UA. Specifically, at the point of time when the button BN31 on the operation panel 63a (FIG. 11) is pressed and the customized information relating to the user UA is requested by the image forming apparatus 1a, the image forming apparatus 1b may perform the above conversion of each of the plurality of operation modes included in the customized information relating to the user UA.

Though the case where the conversion of the operation modes, or the like, is performed in response to the call-up of the customized information in the above-discussed preferred embodiment, this is only one exemplary case.

For example, the conversion of the operation modes may be performed in advance when the customized information is registered. Specifically, at the point of time when the button BN63 and any one of the buttons BN41 to BN52 on the operation panel 63c (FIG. 6) are sequentially pressed and the customized information relating to the user UA is requested to be registered, the following operation may be performed.

In detail, first, the image forming apparatus 1c which makes entries sends an entry request including the operation mode information to be registered in the customized information to the data management apparatus 90. The data management apparatus 90 forwards the received entry request to the image forming apparatus 1b. The image forming apparatus 1b communicates with the image forming apparatuses 1a and 1c, or the like, to acquire the capability information MB or the like of the image forming apparatuses 1a, 1b, and 1c and determines whether or not there is any image forming apparatus which needs to perform the conversion of the operation mode (and/or the function mode) to be registered. Then, the image forming apparatus 1b generates the converted operation mode information (including the converted execution information) to be used to execute the operation mode in the image forming apparatus which is determined to need the conversion and stores the operation mode information therein. After that, when the operation mode is called up, the image forming apparatus 1b sends (back) the converted operation mode information stored therein to the image forming apparatus (e.g., 1a) which calls up the mode. Thus, by the preliminary conversion at the time of entry, since the conversion is performed in advance prior to the call-up of the predetermined operation mode in the customized information, it is not necessary to perform a substantial conversion when the call-up is performed (the conversion request is given) after that. Therefore, it is possible to respond to the conversion request more quickly as compared with the case where the conversion is started at the point of time when the conversion request is generated in the call-up operation.

Further, when the image forming apparatus 1c gives an instruction for making an entry of the customized information including a plurality of operation modes to the data management apparatus 90, the above conversion may be performed for each of the plurality of operation modes. Specifically, there may be a case where the data management apparatus 90 forwards the instruction for making an entry of the customized information including the plurality of operation modes to the image forming apparatus 1b and the image forming apparatus 1b performs collective conversion for the plurality of operation modes.

Furthermore, instead of storing the result of such a conversion at the entry as discussed above in the image forming apparatus 1b, the conversion result may be forwarded in advance to the image forming apparatuses 1a, 1c, and the like in the image forming system 100 and stored therein. The image forming apparatus 1a or the like does not need to acquire the conversion result from the image forming apparatus 1b via the network every time when the call-up is performed in the image forming apparatus 1a.

In the above-discussed preferred embodiment, discussion has been made on the case where the image forming apparatus 1b can convert (divide) all the functions which can be executed by the image forming apparatus 1c into jobs which can be executed by a relatively low-level image forming apparatus. In general, however, there may be a case where the image forming apparatus 1b cannot convert all the functions of the image forming apparatus 1c. In such a situation, it is desirable to check if the image forming apparatus 1b (mode conversion apparatus) can convert each of the functions of the image forming apparatus 1c which makes an entry of the customized screen in advance.

For this reason, such an operation as discussed below, for example, may be performed when the entry of the customized information is made. First, when the image forming apparatus 1c sends the entry request of the customized information for a specific user to the data management apparatus 90, the data management apparatus 90 forwards the entry request to the image forming apparatus 1b (mode conversion apparatus). Then, in response to the entry request (including the customized information), the image forming apparatus 1b performs the following operation. The image forming apparatus 1b first determines whether or not the conversion of each of all the operation modes in the customized information can be carried out. The image forming apparatus 1b sends the determination result back to the image forming apparatus 1c (directly or through the data management apparatus 90). The image forming apparatus 1c displays the determination result on the basis of the content of the result which is sent back. By such an operation, the user can know in advance that the conversion of the operation modes cannot be carried out, even if the image forming apparatus 1b is an apparatus which is older than the image forming apparatus 1c and not capable of performing the conversion of a new function of the image forming apparatus 1c, and the like.

Though discussion has been made on the case where the high function apparatus (image forming apparatus 1c) has all the functions of the low function apparatus (image forming apparatus 1a) in the above-discussed preferred embodiment, this is only one exemplary case. Also in a case, for example, where the high function apparatus does not have some of the functions of the low function apparatus, or in other words, where the high function apparatus does not completely include all the functions of the low function apparatus, the above-discussed principle can be applied. Specifically, the above principle can be applied to the case where an apparatus is intended to implement a function which is not included in this apparatus but is included in another apparatus.

Further, in the above-discussed preferred embodiment, discussion has been made on the case where a program, a database, and the like used for performing the operation mode converting process are stored in advance in the nonvolatile memory (EEPROM or the like) in the image forming apparatus 1b. The program and the database may be stored in any type of nonvolatile storage part such as a HDD, which is not limited to the nonvolatile memory. Further, the program and the database stored in the nonvolatile storage part may be updated via the network communication or the like. Alternatively, there may be a case where a (upgraded) program or the like which is newly acquired by downloading or the like is stored additionally to the (old version) program or the like which has been already stored and the newly-acquired program or the like is used instead of the already-existing program or the like. Such an update may be performed by an update part (not shown) implemented by the controller 9. The update part is a processing part for updating any type of database (conversion database) and any type of program. The update part updates the database and/or the program by downloading or the like of a database of the latest version and/or a program of the latest version via the network NW. In a case where a new image forming apparatus having a new function mode is added in the system or the like cases, it further becomes possible to convert the new function mode by adding the corresponding function mode through such updating of the program or the like, Though discussion has been made on the case where the conversion database DB relating to the function modes is stored inside the image forming apparatus 1b in the above-discussed preferred embodiment, this is only one exemplary case and the conversion database DB may be stored in an apparatus (e.g., the data management apparatus 90 or the like) outside the image forming apparatus 1b. In such a case, the image forming apparatus 1b (information converter) accesses the external conversion database DB to acquire required data as necessary.

Though discussion has been made on the case where the functional level information is stored inside the image forming apparatus 1a (job execution apparatus for executing a copy job and the like) in the above-discussed preferred embodiment, this is only one exemplary case and the functional level information (possessed-function information) may be stored in an apparatus (e.g., the data management apparatus 90 or the like) outside the image forming apparatus 1a.

Though discussion has been made on the case where the image forming apparatus 1a determines whether or not a specific function mode is installed in the image forming apparatus 1a on the basis of the functional level information MC of the image forming apparatus 1a (job execution apparatus) in the above-discussed preferred embodiment, this is only one exemplary case. For example, the information converter (image forming apparatus 1b or the like) may determine whether or not the specific function mode is installed in the image forming apparatus 1a on the basis of the data in the information converter. Specifically, first, the information converter acquires the respective pieces of possessed-function information (functional level information and the like) of the image forming apparatuses 1a, 1b, and 1c in advance and stores the information therein. Then, the information converter determines whether or not the function modes in the operation mode information MJ4 sent from the image forming apparatus 1a are installed in the image forming apparatus 1a. Further, the information converter determines whether to execute the conversion in response to the determination result and sends the determination result (including the converted operation mode information and the like) back to the image forming apparatus 1a.

Though discussion has been made on the case where the image forming apparatus 1b performs the operation mode converting process in the above-discussed preferred embodiment, this is only one exemplary case.

For example, the image forming apparatus (1a, 1c, or the like) other than the apparatus 1b may perform the operation mode converting process. In more detail, the image forming apparatus 1c which makes entries may perform the operation mode converting process. Alternatively, the image forming apparatus 1a (job execution apparatus) which makes an inquiry may also perform the operation mode converting process. Further, an apparatus (e.g., the data management apparatus 90) other than the image forming apparatuses may perform the operation mode converting process.

In a case where a plurality of apparatuses (image forming apparatuses and the like) can perform the operation mode converting process in the image forming system 100, which one of the apparatuses should serve as the information converter (mode conversion apparatus) may be determined by mutual communication or the like. There may be a case, for example, where respective pieces of version information of the program and the like (in detail, a converting program, a converting database, and/or the like) which are executed in the image forming apparatuses are mutually exchanged and the image forming apparatus corresponding to the program and the like of the latest version is determined as the information converter. Such an operation may be performed by the inquiry target determination part 17 and the like of the image forming apparatus 1.

Further, each image forming apparatus may acquire a program and the like of the relatively new version by copying the program and the like of the other image forming apparatus. There may be a case, particularly, where a specified one of a plurality of image forming apparatuses in the image forming system is appointed (fixed) as the information converter and the information converter copies the program and the like, to thereby acquire the program and the like of the relatively new version.

Though discussion has been made on the case where the mode information conversion part 15 converts an "operation mode (including a plurality of function modes)" in the above-discussed preferred embodiment, this is only one exemplary case. The mode information conversion part 15 may converts only a "function mode" included in the operation mode. For example, the image forming apparatus 1a sends only the execution information (tag information TG41 or the like) of the "function mode" which cannot be analyzed by the image forming apparatus 1a to the image forming apparatus 1b, the mode information conversion part 15 of the image forming apparatus 1b converts the execution information (tag information TG41 or the like) of the function mode into the converted execution information (tag information TS41), and the image forming apparatus 1b sends the converted execution information back to the image forming apparatus 1a.

Though discussion has been made on the case where the customized information is stored in the data management apparatus 90 in the above-discussed preferred embodiment, this is only one exemplary case. For example, the customized information may be stored in an image forming apparatus. Alternatively, the customized information may be stored in a portable recording medium such as a USB memory or the like. In more detail, the customized information stored in the portable recording medium such as a USB memory may be imported and/or exported by each of the image forming apparatuses. The plurality of image forming apparatuses can thereby share the customized information. Further, the above-discussed functional level information (possessed-function information) or the like may be also stored in a USB memory or the like and shared by the plurality of image forming apparatuses.

While the invention has been shown and described in detail, the foregoing description is in all aspects illustrative and not restrictive. It is therefore understood that numerous modifications and variations can be devised without departing from the scope of the invention.

What is claimed is:

1. An information converter, comprising:
   a first acquisition part for acquiring information on a function mode which is installed in a first image forming apparatus and not installed in a second image forming apparatus; and
   a converter for dividing an operation to be executed in said function mode into a plurality of sub jobs which can be executed by said second image forming apparatus and converting said information on said function mode into information used to allow only said second image forming apparatus to execute all of said plurality of sub jobs.

2. The information converter according to claim 1, further comprising:
   a second acquisition part for acquiring information on a installed function which is installed in said second image forming apparatus,
   wherein said converter divides said operation to be executed in said function mode into said plurality of sub jobs which can be executed by said second image forming apparatus, on the basis of said information on said installed function.

3. The information converter according to claim 2, further comprising:
   a determination part for determining whether or not conversion by said converter is needed, on the basis of said information on said installed function.

4. The information converter according to claim 2, further comprising:
   a first storage part for storing therein said information on said installed function.

5. The information converter according to claim 1, further comprising:
   a second storage part for storing therein said information which is obtained by conversion by said converter and used to allow said second image forming apparatus to execute combination of said plurality of sub jobs.

6. The information converter according to claim 1, further comprising
   a transmission part for transmitting said information which is obtained by conversion by said converter and used to allow said second image forming apparatus to execute combination of said plurality of sub jobs.

7. The information converter according to claim 1, wherein
   said function mode is a function mode included in operation setting information customized for a specific user.

8. The information converter according to claim 7, wherein said function mode is a function mode included in operation setting information registered in said first image forming apparatus.

9. The information converter according to claim 1, wherein
said information converter is an image forming apparatus.

10. The information converter according to claim 1, wherein
said information converter is a server connected to an image forming apparatus.

11. A nontransitory computer readable recording medium encoded with a program for causing an information converter to execute a method comprising:
acquiring information on a function mode which is installed in a first image forming apparatus and not installed in a second image forming apparatus; and
dividing an operation to be executed in said function mode into a plurality of sub jobs which can be executed by said second image forming apparatus and converting said information on said function mode into information used to allow only said second image forming apparatus to execute all of said plurality of sub jobs.

12. The nontransitory computer readable recording medium according to claim 11, the method further comprising:
acquiring information on a installed function which is installed in said second image forming apparatus, and
dividing said operation to be executed in said function mode into said plurality of sub jobs which can be executed by said second image forming apparatus, on the basis of said information on said installed function.

13. The nontransitory computer readable recording medium according to claim 12, the method further comprising:
determining whether or not conversion by said information converter is needed, on the basis of said information on said installed function.

14. The nontransitory computer readable recording medium according to claim 12, the method further comprising:
storing in the information converter said information on said installed function.

15. The nontransitory computer readable recording medium according to claim 11, the method further comprising:
storing in the information converter said information which is obtained by conversion by said information converter and used to allow said second image forming apparatus to execute combination of said plurality of sub jobs.

16. The nontransitory computer readable recording medium according to claim 11, the method further comprising:
transmitting said information which is obtained by conversion by said information converter and used to allow said second image forming apparatus to execute combination of said plurality of sub jobs.

17. The nontransitory computer readable recording medium according to claim 11, wherein
said function mode is a function mode included in operation setting information customized for a specific user.

18. The nontransitory computer readable recording medium according to claim 17, wherein
said function mode is a function mode included in operation setting information registered in said first image forming apparatus.

19. The nontransitory computer readable recording medium according to claim 11, wherein
said information converter is an image forming apparatus.

20. The nontransitory computer readable recording medium according to claim 11, wherein
said information converter is a server connected to an image forming apparatus.

* * * * *